(12) United States Patent
Knights et al.

(10) Patent No.: US 12,481,724 B1
(45) Date of Patent: Nov. 25, 2025

(54) SYSTEMS AND METHODS FOR DETERMINING STATES USING RUN-LENGTH ENCODERS, BINARIZED BINS, AND K-MEANS CLUSTER MODELS

(71) Applicant: SonderMind Inc., Denver, CO (US)

(72) Inventors: Jonathan Knights, Lawrenceville, NJ (US); Xiao Yang, Lancaster, PA (US); Holly Dubois, McQueeney, TX (US); Vincent Mysliwiec, San Antonio, TX (US); Hanjie Shen, Issaquah, WA (US)

(73) Assignee: SonderMind Inc., Denver, CO (US)

( * ) Notice: Subject to any disclaimer, the term of this patent is extended or adjusted under 35 U.S.C. 154(b) by 0 days.

(21) Appl. No.: 18/765,835

(22) Filed: Jul. 8, 2024

Related U.S. Application Data

(63) Continuation-in-part of application No. 18/427,327, filed on Jan. 30, 2024, now abandoned.

(60) Provisional application No. 63/442,010, filed on Jan. 30, 2023.

(51) Int. Cl.
*G06F 18/23213* (2023.01)
*G06F 16/2458* (2019.01)

(52) U.S. Cl.
CPC .... *G06F 18/23213* (2023.01); *G06F 16/2477* (2019.01)

(58) Field of Classification Search
CPC .............. G06F 18/23213; G06F 16/2477
See application file for complete search history.

(56) References Cited

U.S. PATENT DOCUMENTS

| | | | |
|---|---|---|---|
| 9,288,298 B2* | 3/2016 | Choudhary | A61B 5/22 |
| 10,938,593 B2* | 3/2021 | McLaughlin | H04L 12/4633 |
| 11,712,198 B2* | 8/2023 | Dafna | A61B 5/7264 600/586 |
| 2015/0313529 A1* | 11/2015 | Nevo | A61B 5/4809 600/595 |
| 2019/0246968 A1* | 8/2019 | Matic | G16H 40/67 |
| 2019/0318244 A1* | 10/2019 | Alvarez | G06N 3/006 |
| 2020/0005618 A1* | 1/2020 | Masuda | G08B 3/10 |

OTHER PUBLICATIONS

Knights, et al. "Associations of smartphone usage patterns with sleep and mental health symptoms in a clinical cohort receiving virtual behavioral medicine care: a retrospective study," Sleep Advances, 2023, 4(1):1-12.

* cited by examiner

*Primary Examiner* — William P Bartlett
(74) *Attorney, Agent, or Firm* — COOLEY LLP

(57) ABSTRACT

In some embodiments, a method includes receiving longitudinal interaction data. The longitudinal interaction data is sorted into a plurality of bins. Using a run-length encoder, at least one inactivity period indication is generated, and an inferred period indication is generated based on the at least one inactivity period indication. The method also includes (1) generating, based on the plurality of bins, a plurality of activity metrics and (2) sorting, using a clustering model and based on the plurality of activity metrics, the plurality of bins to produce an inactivity cluster. An expected period indication and a characteristic value are generated based on (1) the inferred period indication and (2) the expected period indication. A series of actions is determined by providing, via the processor, the characteristic value as input to a machine learning model.

17 Claims, 12 Drawing Sheets

SYSTEMS AND METHODS FOR DETERMINING STATES USING RUN-LENGTH ENCODERS, BINARIZED BINS, AND K-MEANS CLUSTER MODELS

CROSS-REFERENCE TO RELATED APPLICATIONS

This application is a continuation-in-part of U.S. patent application Ser. No. 18/427,327, filed Jan. 30, 2024, and titled "USING OBJECTIVE SMARTPHONE ACTIVITY DATA FOR THERAPY AND CLINICAL TREATMENT," which claims priority to and the benefit of U.S. Provisional Patent Application No. 63/442,010, filed Jan. 30, 2023, and titled "USING OBJECTIVE SMARTPHONE ACTIVITY DATA FOR THERAPY AND CLINICAL TREATMENT," each of which is incorporated herein by reference in its entirety.

FIELD

One or more embodiments described herein relate to systems and computerized machine learning methods for predicting states and generating actions based on data from a mobile compute device.

BACKGROUND

Sleep disturbances can be a risk factor for and marker of mental health disorders including anxiety and depression. Some known methods of evaluating sleep disturbances rely on self-reported smartphone usage, which can be inaccurate. Thus, there is a need for systems and methods for objectively detecting, analyzing, and mitigating smartphone usage.

SUMMARY

In some embodiments, a non-transitory processor-readable medium stores code representing instructions to be executed by one or more processors, the instructions including code to cause the one or more processors to receive (1) past interaction data associated with (a) a mobile device and (b) a first user, (2) current interaction data associated with the mobile device and the first user, and (3) first past state data associated with the first user. Based on the past interaction data, an expected time window indication is generated, and based on the current interaction data, an inferred time window indication is generated. A first consistency metric is generated based on the inferred time window indication and the expected time window indication. A first disruption metric is generated based on the current interaction data and the expected time window indication. The instructions also include code to cause the one or more processors to predict a current state associated with the first user, based on the first past state data, the first consistency metric, the first disruption metric, second past state data associated with a second user, a second consistency metric associated with the second user, and a second disruption metric associated with the second user. A first embedding is generated based on the current state, and an action to cause the first user to have a future state is predicted based on a difference between the first embedding and a second embedding associated with the second user.

In some embodiments, a method includes receiving, at a processor, longitudinal interaction data associated with a mobile device and including time data. The method also includes sorting, via the processor, the longitudinal interaction data into a plurality of bins based on the time data, each bin from the plurality of bins being associated with a time interval. Providing the plurality of bins as input to a run-length encoder, at least one inactivity period indication is generated via the processor, and an inferred period indication is generated via the processor and based on the at least one inactivity period indication. The method also includes (1) generating, via the processor and based on the plurality of bins, a plurality of activity metrics and (2) providing, via the processor, the plurality of activity metrics as input to a k-means clustering model to sort the plurality of activity metrics and produce an inactivity cluster. An expected period indication is generated via the processor and based on the inactivity cluster, and a characteristic value is generated via the processor and based on (1) the inferred period indication and (2) the expected period indication. A series of actions is determined by providing, via the processor, the characteristic value as input to a machine learning model.

BRIEF DESCRIPTION OF THE DRAWINGS

Various non-limiting and non-exhaustive aspects and features of the present disclosure are described herein below with references to the drawings.

Figure 1A:
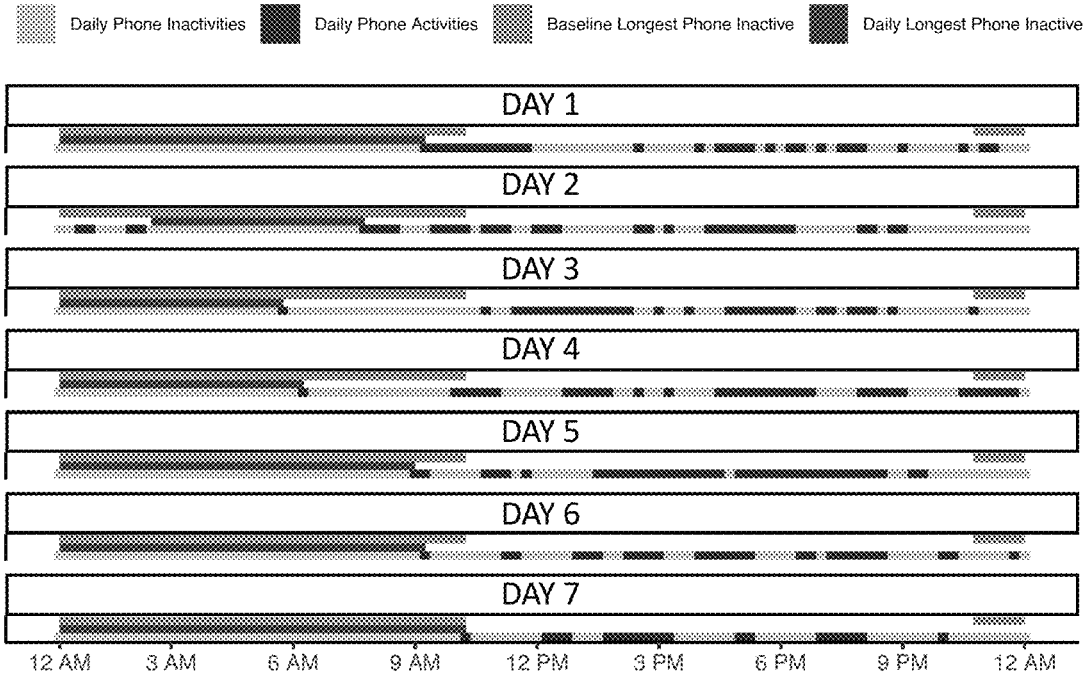
FIGS. 1A-1D are charts showing example sets of behavioral measurements based on daily smartphone interaction data relative to baseline data, in accordance with one or more embodiments.
Figure 1B:
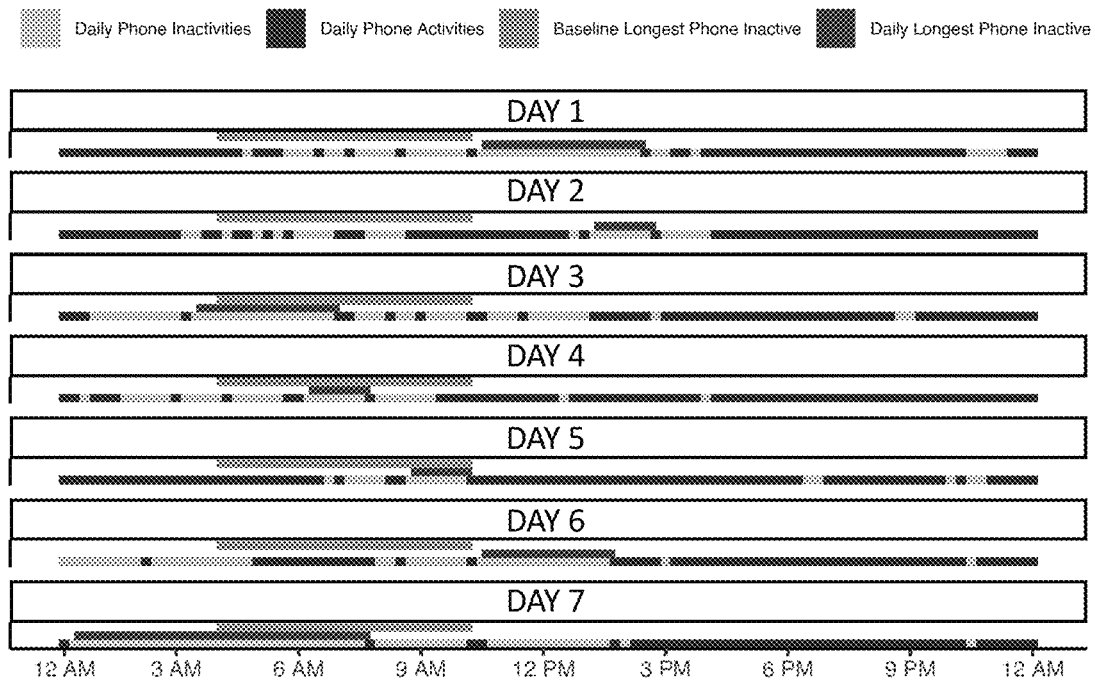

Like reference numbers and designations in the various drawings indicate like elements. Skilled artisans will appreciate that elements in the Figures are illustrated for simplicity and clarity, and have not necessarily been drawn to scale, for example, with the dimensions of some of the elements in the figures exaggerated relative to other elements to help to improve understanding of various embodiments. Common, well-understood elements that are useful or necessary in a commercially feasible embodiment are often not depicted in order to facilitate a less obstructed view of these various embodiments.

DETAILED DESCRIPTION

Smartphone usage is ubiquitous throughout society with most adults owning a smartphone. These devices, through their multiple sensors, have been used to provide insight into an individual's behavior. Passive sensing of smartphone usage can be useful to monitor health-related behaviors. While there have been a growing number of studies, especially in the mental health and physical activity domains, there is a relative scarcity of evidence of the association between objective smartphone usage and clinical outcomes.

Passively sensed human-smartphone interactions can be used to describe circadian rhythms and sleep-related outcomes. For example, in some embodiments, the temporal pattern of smartphone usage behavior in non-clinical populations can increase in the morning, peak in the early evening, and subsequently decrease during the nighttime.

In some embodiments, periods of phone usage and non-usage can infer sleep patterns, including sleep duration and circadian preference. In some embodiments, smartphone usage assessed by tappigraphy (e.g., touchscreen interactions while the device is in the unlocked state) can be compared to standard wrist-worn actigraphy. Sleep measures from actigraphy, including sleep onset and offset, can correlate with smartphone usage; however, sleep duration measured by smartphone usage can be shorter than actigraphy in some users. This is because smartphone assessment captured periods of time when individuals were awake that were not captured by actigraphy. Smartphone usage during the inferred sleep period, which occurs when an individual is awake, may be frequent and indicative of sleep fragmentation or disruptions. Accordingly, periods of smartphone inactivity can follow a circadian pattern and correlate with sleep onset, offset and duration and provide unique information not captured by standard wearable devices.

Human-smartphone interactions can also contribute to changes in sleep-related outcomes. The importance of sleep health, which includes sleep duration, timing or regularity, and efficiency, for both physical and mental wellbeing, is increasingly recognized throughout society. While smartphone applications can evaluate sleep and circadian rhythms, as well as screen for sleep disorders such as sleep apnea, smartphone usage prior to and during the sleep period can result in sleep disturbances including difficulties falling asleep, shortened sleep duration and daytime impairment. Evaluating smartphone usage patterns for the duration of inactivity, regularity of inactivity and usage during these periods of inactivity can provide insight into sleep-related behavioral patterns in large clinical and non-clinical populations.

Sleep disturbances can also be a risk factor for, and marker of, mental health disorders including anxiety and depression. Some known studies, rely on self-reported smartphone usage and not on objective usage measures to correlate with subjective sleep and behavioral health symptoms. Self-reported usage is often inaccurate, particularly for individuals with problematic usage. Objective measures of smartphone usage can be used for methodologically rigorous studies and advancing the understanding of this growing field.

Thus, smartphone activity data provides unique information regarding circadian patterns and is beneficial for informing mental and physical health characteristics for therapy and clinical treatment.

At least some methods, non-transitory, computer-readable storage mediums storing executable code, and systems described herein use objective smartphone activity data to correlate, for example, mental and physical health characteristics for therapy and clinical treatment. Using passively collected smartphone data, patterns of smartphone usage and inactivity are characterized for a group of users receiving therapy and/or clinical treatment (e.g., behavioral medicine, sleep medicine, physical medical care). The objective framework, as implemented by a computing system (e.g., that is structurally and/or functionally similar to the computing system 700 of FIG. 7A) identifies smartphone periods of inactivity for individuals—the longest period of inactivity being correlated with an expected and/or inferred sleep period—and assesses the relationship between behavioral patterns within this sleep period and a set of self-reported clinical outcomes including sleep disturbances and symptoms of anxiety and depression. The behavioral measures of smartphone usage may include, for example, the longest period of smartphone inactivity on a daily basis (e.g., inferred sleep period (ISP), an inferred time window indication, and/or an inferred period indication), windowed (e.g., 30-days, one week, one month) longest period of smartphone inactivity (e.g., expected sleep period (ESP), an expected time window indication, and/or an expected period indication), regularity of the daily ISP compared to the ESP (e.g., overlap percentage and/or another consistency metric as a marker of regularity), smartphone usage during the ESP (e.g., disruption of sleep, nocturnal wakefulness, and other disruptions during the expected sleep period), and anomaly measures. In some examples, lower regularity of the overlap percentage or greater disruptions (e.g., nocturnal wakefulness) during the ESP may be associated with higher scores on the sleep disturbance (e.g., nocturnal wakefulness) measure. In some examples, lower consistency of the overlap percentage or greater disruptions during the ESP may be associated with greater depressive and anxiety symptoms. In still other examples, overlap percentage and disruptions may be associated with anomalies and other mental and physical issues.

At least some methods and system described herein are directed to using rest and sleep characteristics computed, or otherwise derived or correlated, from passively sensed smartphone data for mental health therapy and clinical treatment. Behavioral measures may be computed from passively sensed human-smartphone interactions from a clinical cohort to determine associations of these measures with sleep disturbance, anxiety, and depressive symptoms, among other mental and physical health issues. Thus, objective smartphone behavioral measures may be used to monitor mental health symptoms (e.g., sleep disturbances, depressive symptoms, anxiety symptoms, suicidal ideations, seasonal affective disorder, bipolar disorder symptoms, insomnia, obstructive sleep apnea, restless legs syndrome, and/or the like) and/or to direct therapy and clinical treatment and services for mental and physical health. In some implementations, at least some systems described herein can cause an anomaly alert to be sent to a user, the anomaly alert indicating a change in state (e.g., a change in a mental health condition) and/or the like.

Using passively sensed smartphone data from a group of users receiving therapy and/or clinical treatment (e.g., behavioral medical care, physical medical care), via the computing system, behavioral measurements including period(s) of inactivity (e.g., longest period of smartphone inactivity, inferred sleep period (ISP)) may be determined and characteristics of inactivity (e.g., quantity, consistency, disruption, etc., of sleep and/or rest) may be derived. Derived characteristics (e.g., outcome variables) may include quantitative and consistency measures, such as an expected sleep period (ESP) and an overlap percentage between ESP and ISP, disruption measure, such as a number of disruptions (e.g., a number of smartphone interactions, as indicated by a disruption metric) on a daily basis for a given time period (e.g., 30-day window, 7-day window, 365-day window), and other rest characteristics. In some examples, the derived characteristics may be associated (e.g., correlated) with clinical measures, such as sleep disturbance, depression, and anxiety (e.g., part of American Psychiatric Association's DSM-5 L1), which may be self-reported by the smartphone users (e.g., DSM-5 Self-Rated Level 1 Cross-Cutting Symptom Measure, PHQ-9 for depression, GAD-7 for anxiety, and the like), either through surveys or in sessions with a therapy or clinical treatment team member. In other examples, the derived characteristics also may be associated with reported and/or diagnosed mental and physical health symptoms and disorders (e.g., clinician or physician assessed or diagnosed suicidal ideation, bipolar disorder, depression, anxiety, cardiovascular disease, metabolic syndrome, insomnia, sleep disorders, and/or the like).

Various models may be used to correlate mental and physical health symptoms with behavioral measurements and derived characteristics. In examples, a mixed effects model, or other multilevel modeling technique, may be used to predict person-specific and/or group correlations between sleep behaviors and mental and physical health symptoms. In an example model, one or more of the following values may be used as a dependent variable while keeping predictors (e.g., time-invariant, time-varying, between person differences, within-person changes, and/or the like) the same: sleep disturbance, depressive symptom, and/or anxiety symptom. Modeling such correlations may be used to generate reports useful in therapy and clinical treatment of persons, both on a person-specific level (e.g., for persons that participated in providing the analyzed data) and a group level (e.g., for persons that did not provide any prior data for analysis).

Figure 2:
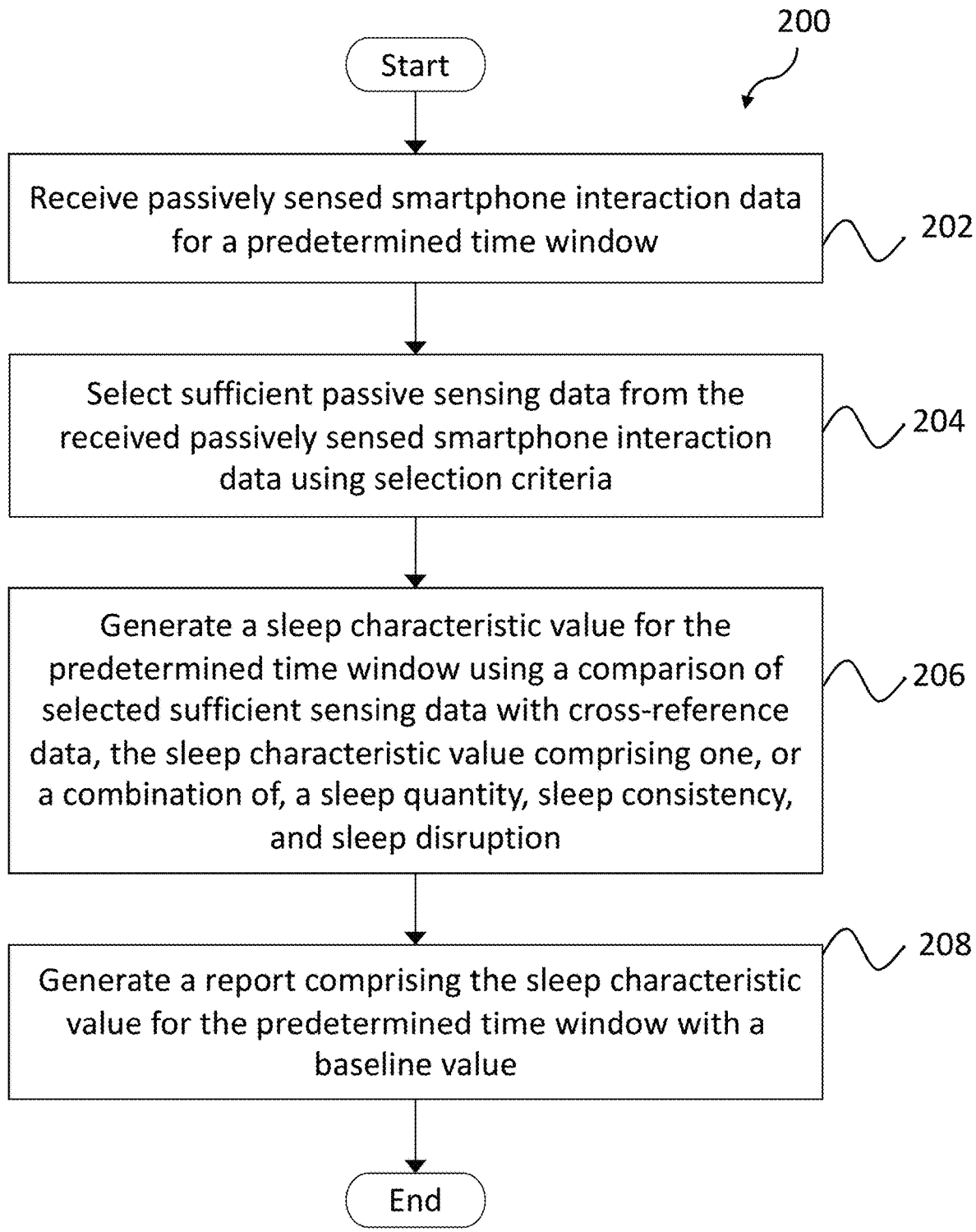
FIG. 2 is a flow diagram illustrating an example method for using objective smartphone activity data for therapy and clinical treatment, in accordance with one or more embodiments.

FIG. 2 is a flow diagram illustrating an example method 200 for using objective smartphone activity data for therapy and clinical treatment, in accordance with one or more embodiments. Method 200 can be implemented by a computing system (e.g., that is functionally and/or structurally similar to the computing system 700 of FIG. 7A). Method 200 begins with receiving passively sensed smartphone interaction data (e.g., past interaction data) for a predetermined time window (e.g., a week, 30 days, a month, etc.) in step 202. In some instances, the passively sensed smartphone interaction data can include streamed data that is received over, for example, a 24-hour period. In some examples, the smartphone interaction data may be from a group of users that are engaging, have engaged, or intend to engage in therapy and/or clinical treatment for mental or physical health symptoms. Sufficient passive sensing data may be selected from the received passively sensed smartphone interaction data using selection criteria at step 204. In some examples, selection criteria may comprise one, or a combination, of a minimum number of unique days of user data for a given user, minimum number of unique hours of user data for the given user, availability of cross-reference data (e.g., user-specific symptom survey responses, aggregate correlations between symptoms and passively-sensed smartphone use data, other feedback and sources of relevant information for comparison and correlation) from the given user, and/or the like.

A sleep characteristic value for the predetermined time window may be generated using a comparison of selected sufficient sensing data with cross-reference data, at step 206, the sleep characteristic value comprising one, or a combination of, a sleep quantity (e.g., an aggregation of ISPs), sleep consistency, and/or sleep disruption. In some examples, a daily longest phone inactive period (e.g., an ISP) may be determined from passively-sensed smartphone use data indicating daily phone activity and inactivity, the ISP then being compared against a baseline longest phone inactive period (e.g., ESP or other measure of consistent longest phone inactive period, for example, determined from user-specific historical data from the predetermined time window or other time window) to determine objective measures (e.g., further sleep characteristic values) of sleep consistency and sleep disruption. In other examples, a sleep characteristic value may include additional values (e.g., different value types), such as measures of anomalies. In some examples, a report may be generated comprising a comparison of the sleep characteristic value for the predetermined time window with a baseline value at step 208. In some examples, the baseline value may vary depending on the predetermined time window (e.g., if the predetermined time window is 30-days, the baseline value may be different for one 30-day window versus another 30-day window, if the predetermined time window is a week, the baseline value may be different for one week versus another week, and/or the like). In some examples, the report may comprise a visualization (e.g., visualizations in FIGS. 1A-1D and 4-5). In other examples, one or more values provided in the report may be used to optimize and/or improve treatment thresholds and recommendations, also considering other factors, such as a current clinical state, historical progress and response to treatment, and other data associated with a user.

In some examples, said objective measures may further be correlated with cross-reference data, including user-specific feedback and aggregate group information, to correlate and predict state data that can indicate, for example, mental and physical health characteristics (e.g., symptoms of depression, anxiety, bipolar disorder, suicidal ideation, loneliness, cardiovascular disorder, sleep disorders, metabolic syndrome, Alzheimer's disease, Parkinson's disease, and the like). In some examples, a further report may be generated based on the mental and physical health characteristics correlated and predicted from the sleep characteristic values (e.g., objective measures). Said further report may comprise a visualization (e.g., visualizations in FIG. 6). Such reports and visualizations may be used (e.g., by a mental health care platform, physician, therapist, psychiatrist, psychologist, other care team member) to aid in therapy and clinical treatments (e.g., adjusting clinical care delivery, counseling for electronic use behavior, predicting and preventing symptoms, triggering loneliness care response, prescribing medication, referring to further sleep studies, and the like).

In some examples, cross-reference data (e.g., past state data) may include feedback from users, including information regarding one, or a combination of, the following:

mental health symptoms and severity (e.g., suffers post-traumatic stress disorder, major depressive disorder, generalized anxiety disorder, bipolar disorder), both generally and specific to a given period of time (e.g., related to data capture), demographic information (e.g., age, geography, marital status, employment status, family and/or living situation-living with pets, children, elderly relatives, and/or the like) and/or other social determinants of health, medical history (e.g., diagnosed disorders, hospitalizations, treatment history, physical ailments, and/or the like), phone use habits (e.g., whether a user typically uses their phone right before and after sleep, turns off phone a given amount of time before sleep and makes an effort not to check their phone again until a given amount of time after waking, checks their phone any time they wake up in the middle of the night and/or the like), special events or occurrences during the given period of time, as indicated by circumstance data (e.g., a celebration or party, a family or medical emergency, other extenuating circumstances), notes from clinical and/or other types of sessions with mental and physical health providers;

and other information relevant to the provision of therapy and clinical treatment.

Figure 3:
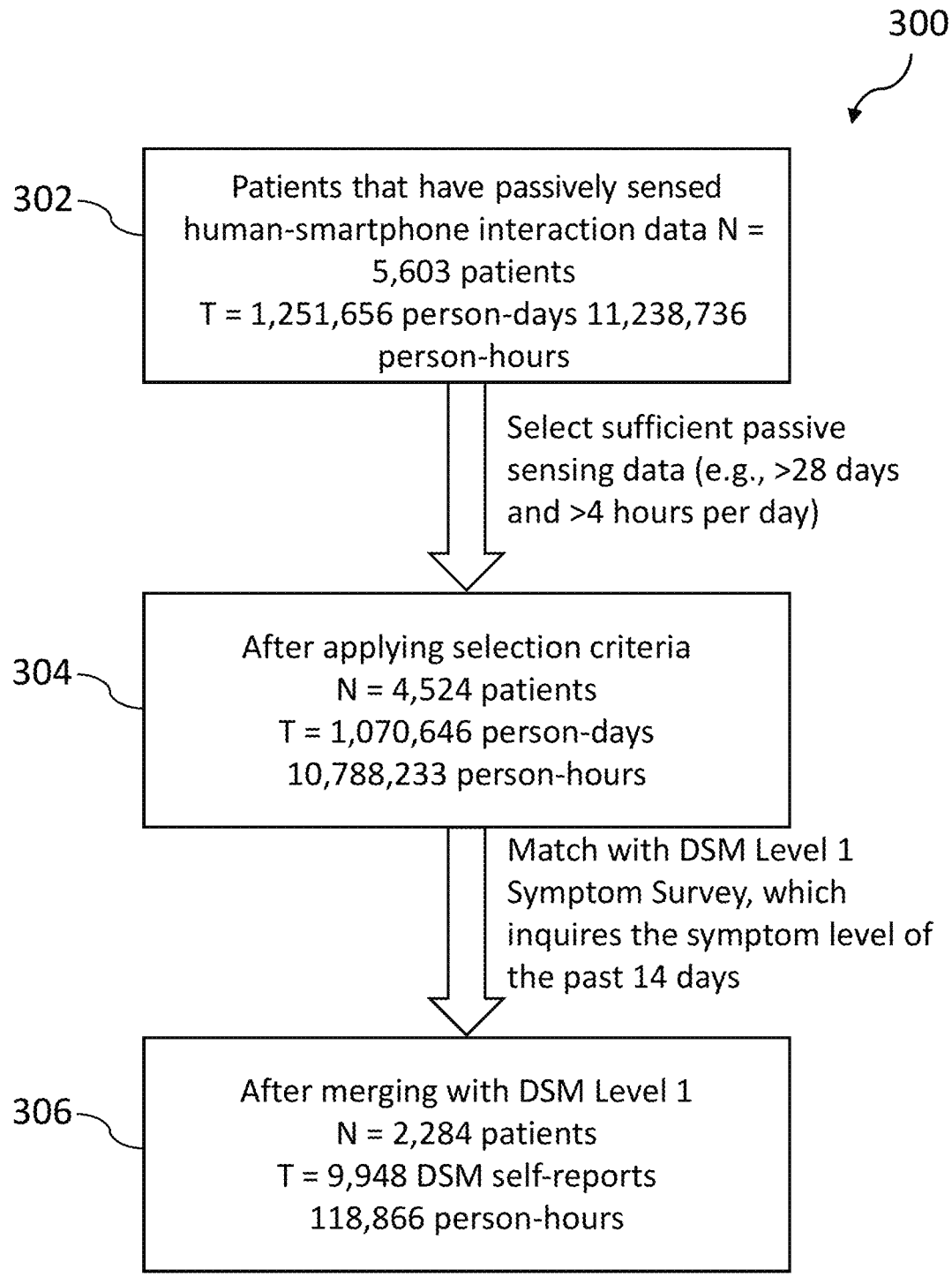
FIG. 3 is a flow diagram illustrating example sets of processed activity data in an example method for using objective smartphone rest and sleep data for therapy and clinical treatment, in accordance with one or more embodiments.

FIG. 3 is a flow diagram illustrating example sets of processed activity data in an example method for using objective smartphone rest and sleep data for therapy and clinical treatment, in accordance with one or more embodiments. The processed activity data can be used by a computing system (e.g., that is functionally and/or structurally similar to the computing system 700 of FIG. 7A) to implement at least some methods described herein. In the example shown in FIG. 3, a group of users receiving mental healthcare via a smartphone platform provided passive smartphone data during a given time period. As shown, a starting data set 302 of passively sensed smartphone interaction (e.g., activity) data comprised 5,603 patients, nearly 1.3 million person-days, and over 11 million person-hours of smartphone interaction data from a given time period. From data set 302, data was selected as being sufficient according to selection criteria (e.g., a unique user having at least 28 unique days and at least 4 unique hours per day of usage) for inclusion in data set 304. As shown, data set 304 comprises 4,524 patients, 1.1 million person-days, and under 11 million person-hours of smartphone interaction data. Data set 304 was then compared (e.g., matched) with cross-reference data (e.g., including DSM Level 1 Symptom Surveys inquiring symptom levels for users over a given time period), resulting in data set 306, comprising 2,284 patients, 9,948 DSM self-reports, and 118,866 person-hours of smartphone interaction data.

In this example, for cross-reference data, as part of routine clinical care, users were asked to report their mental health symptoms at regular intervals (e.g., every 60 days, 30 days, or other given time period). Mental health symptoms may be self-reported using the DSM-5 Self-Rated Level 1 Cross-Cutting Symptom Measure-Adult survey (DSM-5 L1) (e.g., on an app, e-mail, or other electronic format). Patient-reported symptoms, clinical interactions, and passive data collection-including metadata containing information on smartphone interactions-were collected by a mobile health application (e.g., along with informed consent to use the app and have their clinical and passively collected smartphone data used for research purposes from all users before they were enrolled into clinical care).

In some examples, smartphone keyboard and app usage metadata may be collected unobtrusively (e.g., by iOS™, Android™ operating system, or other smartphone systems or applications). Such metadata may include various human-smartphone interactions (e.g., typing, scrolling, app change). A starting time for each even may be recorded with a timestamp.

In the FIG. 3 example, clinical measures used included the domains of sleep disturbance, depression, and anxiety, which are part of the American Psychiatric Association's DSM-5 L1. The questionnaire uses self-reported responses on a given scale (e.g., 5-point Likert scale). In some examples, questionnaire questions may relate to sleep disturbance (e.g., "during the past [insert time period], how much (or how often) have you been bothered by problems with sleep that affected your sleep quality over all?"), depressive symptoms (e.g., "during the past [insert time period], how often have you had little interest or pleasure in doing things?" for anhedonia, "during the past [insert time period], how often have you been feeling down, depressed, or hopeless?" for mood, and the like), anxiety symptoms (e.g., "during the past [insert time period], how often have you been bothered by feeling nervous, anxious, frightened, worried, or on edge?"; "during the past [insert time period], how often have you been bothered by feeling panic or being frightened?"; and "during the past [insert time period], how often have you been bothered by avoiding situations that make you anxious"). Where there are multiple questionnaire items for assessing a single characteristic (e.g., symptom, disorder, problem), the scores for all associated questionnaire items may be averaged, or otherwise weighted, to produce one score or value (e.g., depression symptom score, anxiety symptom score, etc.) as an outcome variable in the analysis.

In some examples, smartphone interaction data may be pre-processed prior to being used in the methods described herein. Through passive sensing technology, a user's interactions with their smartphone may be recorded unobtrusively, for example, in real-time by a health app and transmitted and stored in secure servers, without any additional user input specific for gathering data for this purpose. Such interactions with the smartphone include events such as changing foreground applications, clicking, scrolling, typing, changing views within an application (e.g., selecting a contact to message from a list of contacts), turning the smartphone screen on, and/or any other application change indication. To allow for computation efficiency, smartphone activity may be aggregated into a sequence of bins (e.g., 10-minute interval, 15-minute interval, or other predefined time intervals and/or predefined window length known to provide sufficiently accurate inferences of sleep times). Thereby, each day of a user's phone activity can be represented by a sequence of active and/or inactive values (e.g., an activity metric, such as 1 for active and 0 for inactive) corresponding to a number of bins to encompass the 24-hour period (e.g., 96 15-minute intervals, 144 10-minute intervals, etc.). Similarly stated, a sequence of active and/or inactive values can be represented by a sequence of binarized bin data.

Sleep characteristic values may include a longest period of smartphone inactivity (e.g., the longest consecutive period where there was no human-smartphone interaction and can be used to determine an inferred sleep period) and an inferred sleep period (ISP) (e.g., the longest consecutive inactive bins in each day). In some examples, ISP may be computed (e.g., by a computing system that is structurally and/or functionally similar to the computing system 700 of FIG. 7A) by applying a run-length encoding function (RLE function) in R (and/or a similarly suited run-length encoder) to a sequence (e.g., values corresponding to a 24-hour period of bins) of current interaction data (e.g., that is similar to the current interaction data 804 of FIG. 8), such as daily smartphone activity (e.g., from 00:00 AM to 11:59 PM of the same day), and time data (e.g., timestamps) associated with the current interaction data. The RLE function (executed via the computing device) may return a list of consecutive active/inactive periods (e.g., at least one activity period indication and/or at least one inactivity period indication), and each consecutive active/inactive period in the list can be represented with the starting bin index and the duration of this specific period. The ISP may be selected (e.g., automatically and/or without human intervention) as the inactive period of the longest duration in each day. Similarly stated, the ISP can be the inactivity period indication that specifies a longer duration than any remaining inactivity period indication from the at least one inactivity period indication. In some implementations, the computing system can include an inferred period agent (e.g., that is functionally and/or structurally similar to the inferred period agent 812 of FIG. 8, described herein) configured to generate an indication of the ISP (and/or the like).

Baseline values may include expected sleep period (ESP) and other historical and aggregated data, and/or baseline values may refer to, or be based on, a general comparison window. In some implementations, the computing system can include an expected period agent (e.g., that is functionally and/or structurally similar to the expected period agent 806 of FIG. 8, described herein) configured to generate an indication of the ESP (and/or the like). The ESP can be the average longest period of inactivity across a plurality of days within the given time window. Baseline values may differ from one time window to another time window, of the same time length or different time lengths. In an example, ESP may be determined (e.g., via the computing device) based on past interaction data from a given time window (e.g., 30-day window, a week, a month, and/or other time lengths), representing a relatively consistent pattern of the longest period of smartphone inactivity over the given time window. The past interaction data (e.g., that is similar to the past interaction data 802 of FIG. 8) can include a plurality of bins. For example, if each bin is associated with a 15-minute interval, the past interaction data can include 96 bins. Each bin can be associated with a specific time range, (e.g., 12:00:00 am-12:14:59 am, 12:15:00 am-12:29:59 am, 12:30:00 am-12:44:59 am, etc.), and the past interaction data across the given time window can be aggregated into the plurality of bins (e.g., any activity occurring between 12:00 am-12:14 am in any one day within a 30-day time window can be aggregated into a first bin, any activity occurring between 12:15 am-12:29:59 am in any one day within the 30-day time window can be aggregated into a second bin, etc.). Each bin can have an activity measure (e.g., where active=has human-smartphone interaction events=1 and inactive=no events=0). In some instances, the activity measure can be associated with a discrete and/or continuous range, count data, etc.

In some implementations, ESP may be determined using three steps that can be implemented by the computing device. First, for a given time window (e.g., 30-day time window, with no overlap between a plurality of 30-day windows), an activity metric (e.g., an activity percentage) can be determined for each bin within the given time window. The activity metric can indicate the percentage of days for which activity was recorded during the given time interval for the given bin. Second, the distribution of activity percentages across the plurality of bins (e.g., 96 bins) can be converted to binary activity variables using a clustering model (e.g., an unsupervised clustering model, such as a k-means clustering model, density clustering model, agglomerative clustering model, spectral clustering model, and/or the like) that is executed via the computing device. The k-means clustering model can cluster and/or sort a person-level distribution of the activity metrics (e.g., percentages) into two clusters (e.g., an activity cluster and an inactivity cluster). The cluster with a lower percentage centroid (e.g., a lower activity metric centroid) can be considered inactive (e.g., binarized to 0, to produce a binarized inactivity cluster), and the other cluster can be considered active (e.g., binarized to 1, to produce a binarized activity cluster). Third, following binarization, the longest inactive period can be determined for the given time window (e.g., 30-day time window). For example, the longest inactive period can be determined in a similar manner as the ISP (e.g., using a run-length encoder). The longest inactive period can be characterized by a start time and a duration of the longest inactive period.

Figure 4:
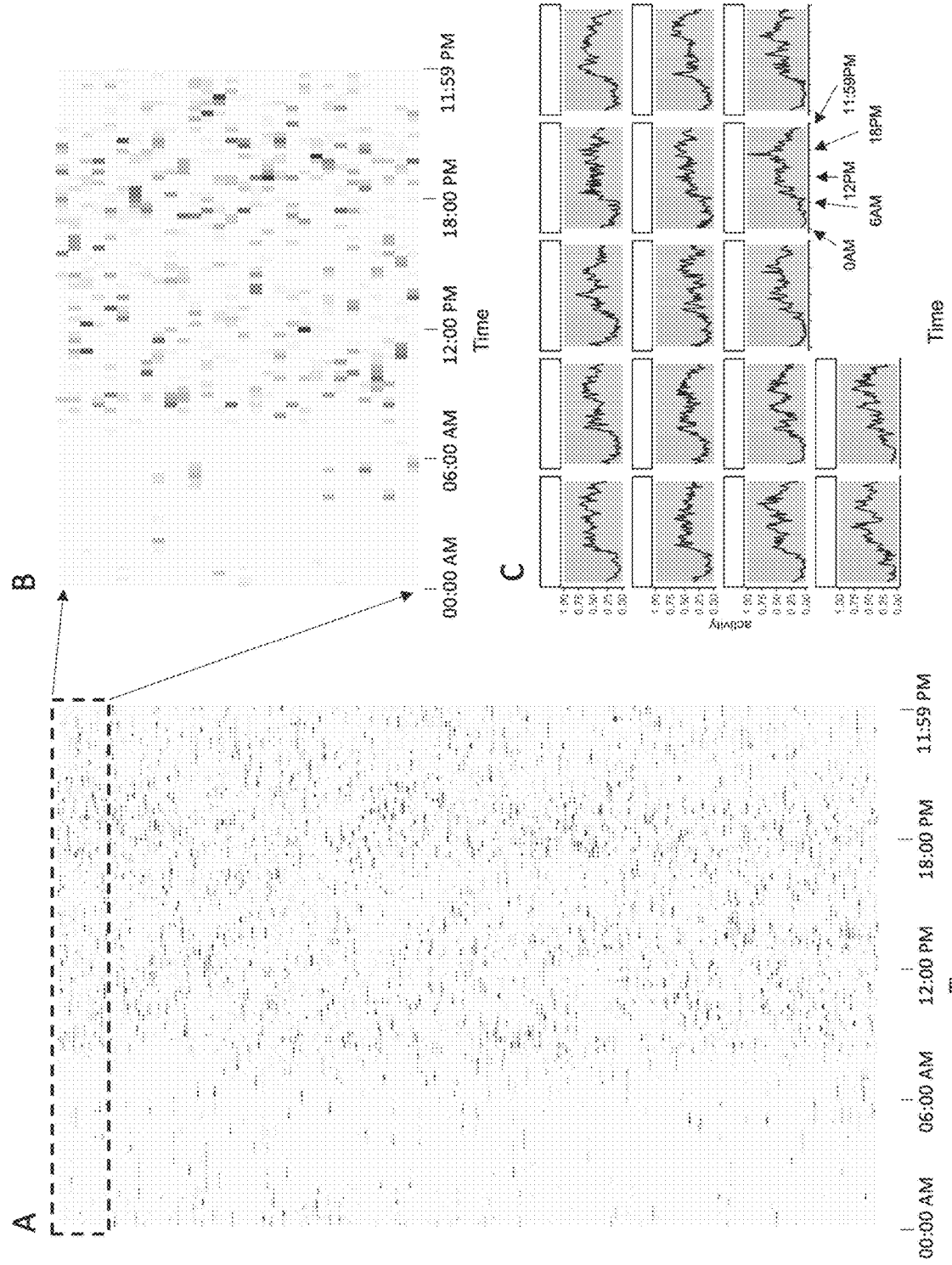
FIG. 4 is a set of charts A-C showing example visualizations of processed smartphone activity data, in accordance with one or more embodiments.

FIG. 4 is a set of charts A-C showing example visualizations of processed smartphone activity data, in accordance with one or more embodiments. The processed smartphone activity data can be used by a computing system (e.g., that is functionally and/or structurally similar to the computing system 700 of FIG. 7A) to implement at least some of the methods described herein. Chart A shows a heatmap of a user's smartphone interaction data over a given number of days (e.g., a given time window), each row representing a day and each column representing a fifteen-minute bin from midnight of day N to midnight of day N+1. Bins may be color-coded, shaded, and/or otherwise distinguished, to show no activity, some activity, and highest activity. A zoomed in portion of Chart A is shown in panel B (e.g., a 30 day window of smartphone interaction). Chart C shows the binarized phone activity for the same user over a 30-day window per fifteen-minute bin, the x-axis is time, the y-axis is activity percentage. The background can be color-coded, shaded or otherwise distinguished, to indicate active and inactive bins. In this example, assessments that can be made from the smartphone usage pattern include: (1) the usual onset of inactivity starts at 23:30 PM and ends at 07:00 AM; (2) some 30-day periods have rather low smartphone activity or disruptions during the inactive periods such as 2019 Dec. 28, while others have higher activity or disruptions such as 2020 Jan. 27; (3) there is some variability across the 30 day windowed approach with changes in onset and offset of smartphone usage.

An overlap percentage of the ESP may be defined as the proportion of the ISP on each day that falls within the 30-day windowed ESP. FIGS. 1A-1D are charts showing example sets of behavioral measurements based on daily smartphone interaction data relative to baseline data, in accordance with one or more embodiments. Charts 102-106 and 112A-B each show disruption and consistency of phone inactivity for a user by showing overlaps between daily activity and inactivity with baseline longest phone inactivity. In some examples, the shown sleep characteristics may be correlated and mapped to a survey, other user feedback, or other cross-reference data to aid in providing the user with care relating to mental and physical health. In these examples, data is shown for a 24-hour period. In other examples, data may be shown and analyzed by 12-hour periods, weekly, biweekly, monthly, or other useful time period measure.

In these examples, each user may be presenting one or more issues, including various sleep disorders (e.g., insomnia, obstructive sleep apnea, restless legs syndrome, and the like), post-traumatic stress disorder (PTSD), major depressive disorder, generalized anxiety disorder, bipolar disorder, suicidal ideation, and/or other mental or physical disorders. Other cross-reference information may be known about the user, including demographic and geographic information, family characteristics, living situation, job/profession, source and level of income, special events that occurred during the time period, and/or the like. Such cross-reference data may be used in combination with the data shown in charts 102-106 and 112A-B may be used to aid in therapy and clinical treatments (e.g., adjusting clinical care delivery, predicting and preventing symptoms, trigger loneliness care response, prescribing medication, etc.).

Figure 1C:
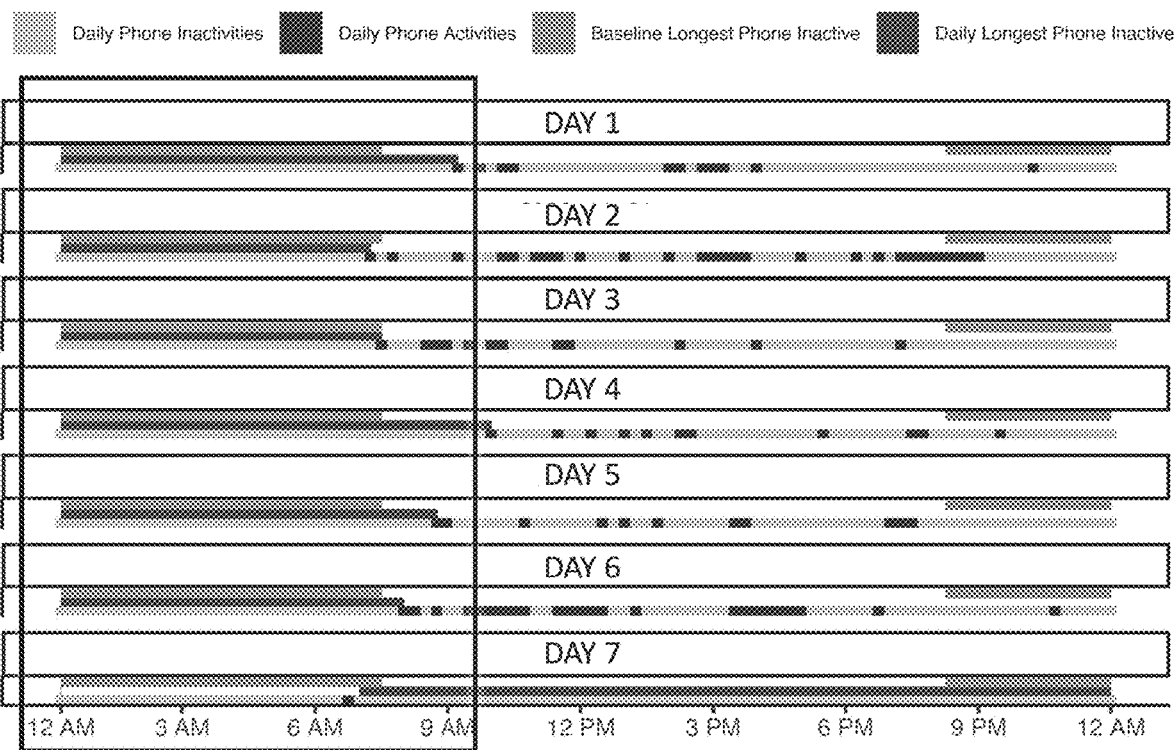
Figure 1D:
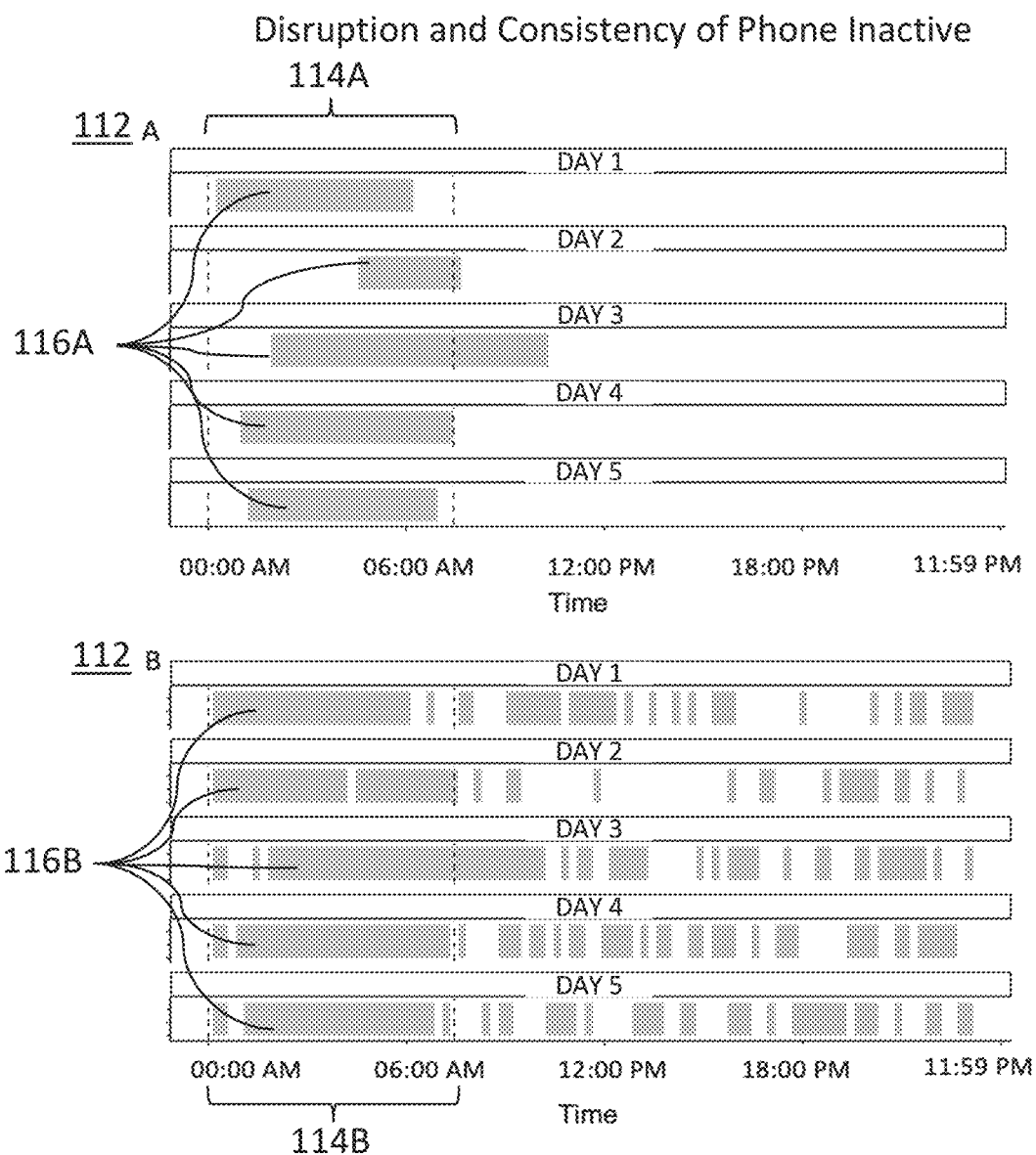

For example, box 110 in chart 106 of FIG. 1C may represent improved sleep consistency due to better smartphone interaction habits, resulting in improving to a less frequent therapy cadence and decreased depressive symptoms. In FIG. 1D, a daily ISP (e.g., gray bars 116A-116B) is shown overlapping with a 30-day windowed ESP 114A-114B (e.g., also indicated between dashed lines, from approximately 00:00 AM to 07:45 AM). Chart 112A shows a daily overlap percentage for 5 days. Chart 112B shows daily disruptions with a 30-day windowed ESP for the same corresponding 5 days, gray bars indicating smartphone inactivity and white bars (or the absence of gray bars) indicating smartphone activity. The number of overlapping bins with the 30-day windowed ESP for these 5 days are: 25, 12, 27, 23, 24, respectively (percentage: 100%, 92%, 66%, 100%, 100% of the daily ISP). In some examples, this calculation allows periods of non-usage, regardless of duration, that are within the time windowed (e.g., 30-day windowed) ESP to have an overlap percentage of 100%.

Disruption may be defined as the total smartphone interactions in each day which occur during the corresponding 30-day windowed ESP. Note that for this variable the sleep period is computed by the 30-day windowed approach (e.g., ESP), while the disruptions are observed on a daily basis for each day within the given 30-day window. The sum of fifteen-minute bins with disruptions for these 5 days are 5, 2, 4, 3, and 4 disruptions respectively. In some implementations, the computing system can include a characteristic generator (e.g., that is functionally and/or structurally similar to the characteristic generator 814 of FIG. 8, described herein) configured to generate the characteristic metric(s).

Figure 7A:
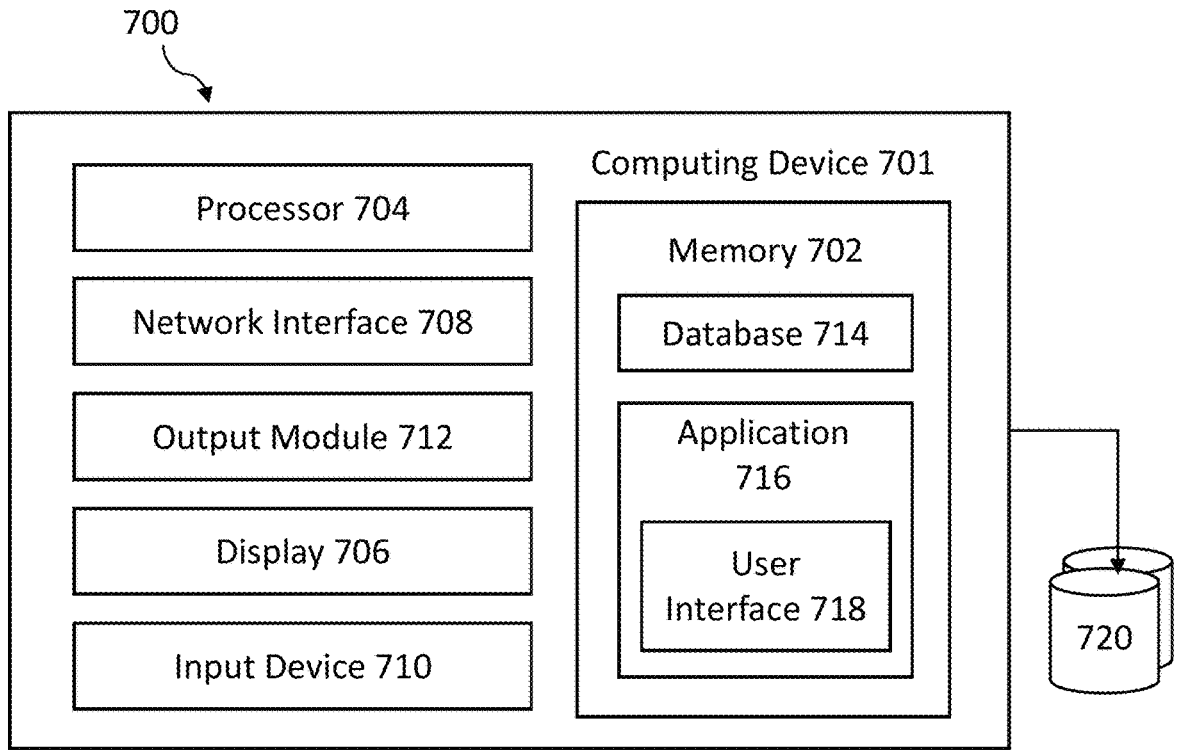
FIG. 7A is a simplified block diagram of an example computing system configured to perform steps of the method illustrated in FIGS. 2-3 and/or FIGS. 9-10, process smartphone interaction data, and/or generate visualizations, in accordance with one or more embodiments.

Various models may be used (e.g., by a computing system that is functionally and/or structurally similar to the computing system 700 of FIG. 7A) to correlate mental and physical health symptoms (e.g., a current state) with behavioral measurements (e.g., a consistency metric(s), a disruption metric(s), and/or any other sleep characteristics) and/or derived characteristics. In some examples, multilevel modeling may be used to accommodate a nested structure in a longitudinal dataset. For example, a linear multilevel model may be used to show the linear relationship between inferred rest measurements and state data, such as subjective reports of mental health status and/or symptoms. In other examples, visualizations shown herein may be used directly to determine patterns and outliers. In still other examples, anomaly detection methods may be used to identify when a user's behavior deviates from expectation (e.g., relative to historical data), and other approaches (e.g., random forest model, neural networks, supervised and unsupervised machine learning models, dynamic treatment regimes, Bayesian networks and/or models, etc.) may be used to predict a future state (e.g., a symptom, mental health state, physical state, etc.) in response to an action (e.g., a recommended behavioral changes) and/or to generate a series of actions (e.g., a series of clinical actions). In some implementations, for example, an unsupervised machine learning model, executed by the computing device, can predict the future state based on a feedback signal that is provided as input to the unsupervised machine learning model. The feedback signal can be generated based on a change in characteristic values that occur in response to successive and/or different series of actions. In some implementations, the computing system can include an action generator (e.g., that is functionally and/or structurally similar to the action generator 818 of FIG. 8, described herein) configured to generate the at least one action.

In some implementations, a machine learning model (e.g., a neural network) can be executed by the computing device to generate a first embedding based on the current state of a first user. The first embedding can be associated with an embedding space, and a second embedding associated with a second user (and/or a population) can also be associated with this embedding space. The second embedding can indicate a state that the first user desires to attain in the future. A difference within the embedding space between the first embedding and the second embedding can indicate an action (e.g., a behavior change) that can be suggested to the user to cause the user to transition from the current state to the future state. For example, high-dimensional (e.g., raw) data associated with a population can be provided as input to a model (e.g., an embedding mode, such as a t-distributed stochastic neighbor embedding (t-SNE) model and/or the like) to generate embeddings (e.g., that are associated with persons within the population) associated with an embedding space. Individuals with a similar characteristic(s) can have respective embeddings that are positioned nearer to one another and further from embeddings associated with individuals having a different characteristic(s). A plurality of groups of individuals can be generated based on the embeddings. For example, a first group of embeddings can be separated by a threshold distance (as measured in the embedding space) from a second group of embeddings. Behavior differences between these groups can be identified to serve as a basis for a behavior change recommendation (e.g., to cause a user to be more similar to a first group than a second group). In some implementations, a distance between two groups can be proportional to a desired behavior change, and a magnitude of a behavior change recommendation (e.g., reducing phone usage by a number of hours per day) can be based on this distance.

In some instances, a directionality between a state and an action can be difficult to determine. For example, increased mobile device activity can cause reduced sleep or, alternatively, reduced sleep (e.g., that is caused by reduced mental health) can cause increased mobile device activity. To determine a directionality metric (e.g., an indication of whether behavior is driving a symptom or the symptom is driving the behavior), a computing system (e.g., that is structurally and/or functionally similar to the computing system 700 of FIG. 7A) can be configured to implement just-in-time adaptive intervention. More specifically, the computing system can be configured to monitor a change in a state relative to a sleep characteristic and/or a change in a sleep characteristic relative to a state. For example, in response to a change in successively inferred states (e.g., a first current state and a second current state predicted after the first current state), the computing system can cause a state request (e.g., a symptom questionnaire) to be sent (e.g., via a notification, message, etc.) to a user's mobile device.

The state request can prompt the user to provide an indication of their current state (e.g., a third current state associated with a time subsequent to the first current state and the second current state) as input to the computing system, which can establish a ground truth. In some instances, the third current state can be received by the computing system before the user's sleep characteristic changes. Based on the third current state (e.g., the ground truth), a directionality metric can be determined by monitoring a change in sleep characteristic over a predetermined time period (e.g., and assuming that the third current state remains fixed over the predetermined time period). A previously predicted action can be modified based on the directionality metric to produce a second action. For example, if the first action indicates that the user should seek mental health help, but the third current state indicates that the user is not experiencing a mental health issue, and the user's sleep characteristic data indicates a lack of sleep consistency and/or an increased number of disruptions, the first action can be modified to, for example, instruct the user to use their phone less during sleeping hours. The computing system can include an action modifier (e.g., that is functionally and/or structurally similar to the action modifier 820 of FIG. 8, described herein) configured to determine the directionality metric and/or modify the action.

In a multilevel modeling framework (e.g., that is implemented by a computing system that is functionally and/or structurally similar to the computing system 700 of FIG. 7A), longitudinal data with repeated measures (e.g., 4×-5× measurements nested within x users, to produce longitudinal interaction data) can be provided as input to a plurality of models (e.g., a multilevel model) that include predictor variables. Predictor variables may be split into time-invariant (e.g., between-person differences) and time-varying (e.g., within-person changes) components and entered into the multilevel model as separate predictors. The predictor variables can include, for example, a plurality of consistency metrics (e.g., overlap percentages). For example, a first consistency metric can be associated with a time-variant overlap percentage (e.g., an overlap percentage difference between a first user and a second user), and a second consistency metric can be associated with a time-invariant overlap percentage (e.g., an overlap percentage change within a time period and for the first user). Associations between behavioral measurements computed from passively-sensed data and outcome variables (e.g., sleep disturbance, depressive symptoms, and anxiety symptoms) may be evaluated (e.g., via the computing system), for example, by including interaction predictors in model. A first model may use sleep disturbance as a dependent variable, a second model may use depressive symptoms as a dependent variable, and a third model may use anxiety symptoms as a dependent variable, all while keeping predictors the same (see, e.g., FIGS. 5-6, described herein). Alternatively or in addition, in some implementations, a single model can jointly (e.g., concurrently) model a plurality of outcome variables (e.g., at least two of sleep disturbance, depressive symptoms, and/or anxiety symptoms). In some examples, relationships among variables may be examined using 2-level models, as follows:

$$\{SIDist_{it}, Dep_{it}, Anx_{it}\} = \beta_{0i} + \beta_{1i} \times wp.OverlapPct_{it} + \beta_{2i} \times wp.SIDisr_{it} + \beta_{3i} \times wp.Dur_{it} + e_{it} \quad (1)$$

$$\beta_{0i} = \gamma_{00} + \gamma_{01} \times bp.Overlap_i + \gamma_{02} \times bp.SIDismrt_i + \gamma_{03} \times bp.Dur_i + u_{0i} \quad (2)$$

$$\beta_{1i} = \gamma_{10} + u_{1i} \quad (3)$$

$$\beta_{2i} = \gamma_{20} + u_{2i} \quad (4)$$

$$\beta_{3i} = \gamma_{30} + u_{3i} \quad (5)$$

where repeated measures of sleep disturbance, depressive symptom, or anxiety symptom for individual i at time t are modeled as a function of person-specific intercepts ($\beta_{0i}$) that indicate baseline level of an outcome variable; user-specific coefficients ($\beta_{\{1-3\}i}$) that indicate the extent of within-person associations between behavioral measures and an outcome variable of interest. $\gamma_{00}$ and $\gamma_{30}$ are sample-level parameters. $u_{0i}$ to $u_{3i}$ are residuals of unexplained between-person differences and are assumed multivariate normal with mean equal to zero and variances $\sigma_{u_{0i}}^2, \sigma_{u_{1i}}^2, \ldots, \sigma_{u_{3i}}^2$.

The models may be fit to the data using, for example, lme4 and/or the like, and incomplete data can be treated as missing at random. User-specific intercepts and coefficients can be simultaneously modeled as a function of between-person and within-person portions of the predictors, respectively. The models can be included in a state predictor that is functionally and/or structurally equivalent to the state predictor 816 of FIG. 8.

Examples have shown a mean level of overlap percentage of approximately 74% (SD=20%), mean level of log transformed disruption of approximately 1.43 (SD=0.52), and mean duration of the ESP of approximately 8.4 hours (SD=2.4) for a group of users. A mean level of self-reported sleep disturbance was 2.17 (SD=1.37), depressive symptoms was 2.16 (SD=1.13), and anxiety symptoms was 1.87 (SD=1.13). Overlap percentage had negative correlations with symptoms of sleep disturbances, anxiety and depression (e.g., from −0.04 to −0.1). Disruption had positive correlations with all three symptoms (e.g., from 0.09 to 0.15). Duration of the ESP had a negative correlation with sleep disturbance (e.g., −0.04) but positive correlations with depressive or anxiety symptoms (e.g., from 0.02 to 0.03).

In still other examples, the methods described herein may be used to infer (e.g., using a machine learning model that is executed by a computing system functionally and/or structurally similar to the computing system 700 of FIG. 7A) other non-sleep activities, personality types, and other characteristics and information about a user that may be beneficial to the planning and execution of therapy and other treatments.

Figure 5:
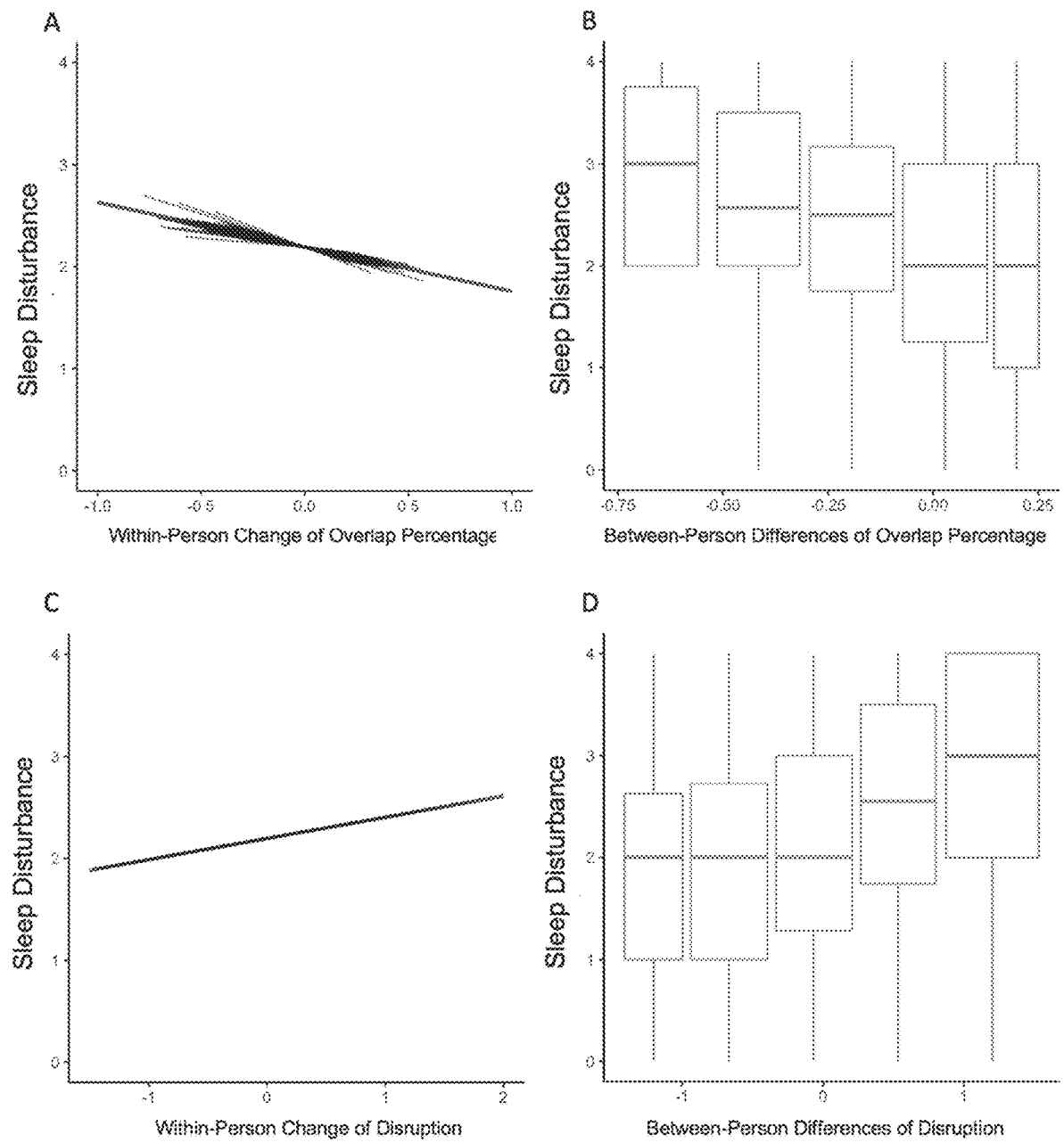
FIG. 5 is set of charts A-D showing example visualizations of sleep characteristic values correlated with cross-reference data, in accordance with one or more embodiments.

FIG. 5 is set of charts A-D showing example visualizations of sleep characteristic values correlated with cross-reference data, in accordance with one or more embodiments. In particular, charts A-D show within- and between-person associations between overlap percentage and self-reported sleep disturbance. Chart A shows within-person associations, which include a sample-level estimated slope of within-person change of overlap percentage and person-level estimated slopes of within-person change of overlap percentage. Chart B shows between-person association, which include the sample-level estimated slope of between-person differences of overlap percentage and the scatter plot of person-mean of overlap percentage and person-mean of sleep disturbance. Similarly, charts C and D are the within-person and between-person associations between sleep disruption and sleep disturbance, respectively. As shown, the within-person association between disruption and sleep disturbance has a rather small variance (e.g., lines overlap), indicating homogenous within-person associations.

Figure 6:
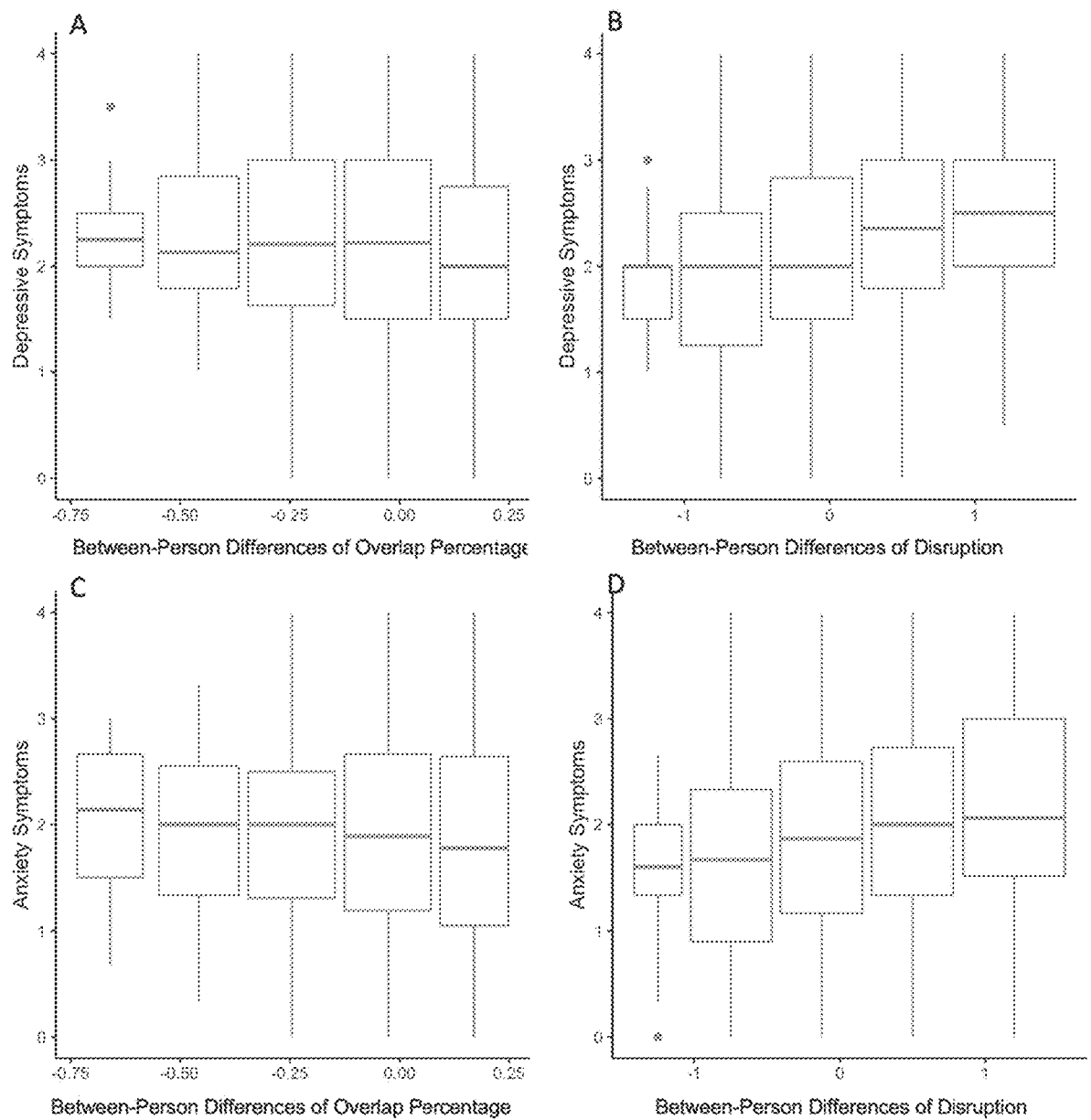
FIG. 6 is a set of charts A-D showing other example visualizations of sleep characteristic values correlated with cross-reference data, in accordance with one or more embodiments.

FIG. 6 is a set of charts A-D showing other example visualizations of sleep characteristic values correlated with cross-reference data, in accordance with one or more embodiments. In particular, charts A-D show boxplots of the between-person differences of overlap percentage or daily disruption and their corresponding depressive or anxiety symptoms. Chart A shows five groups of between-person differences of overlap percentage (groups were split based on the values of between-person differences on the x-axis) and the corresponding value ranges of depressive symptoms on the y-axis. Chart B shows the five groups of between-person differences of daily disruption and the corresponding value ranges of depressive symptoms on the y-axis (grouped using the same method). Similarly, charts C and D are between-person differences of and overlap percentage (or daily disruption) and the corresponding value ranges of anxiety symptoms, respectively.

Greater regularity of ISP and fewer disruptions are associated with lower degrees of symptoms of sleep disturbance, anxiety, and/or depression. Improved sleep is also associated with less suicidal ideations, improved brain and physical health, cognition, and lower risk of cardiovascular disease, dementia (e.g., Alzheimer's disease), metabolic syndromes such as hyperglycemia and high triglycerides, and mortality. The methods described herein may be used to further treatments for brain and physical health, mental and physical health treatments, and cognition performance.

FIG. 7A is a simplified block diagram of an example computing system 700 configured to perform steps of the method illustrated in FIGS. 2-3, process smartphone interaction data, and generate visualizations, in accordance with one or more embodiments. In one embodiment, computing system 700 may include computing device 701 and storage system 720. Storage system 720 may comprise a plurality of repositories and/or other forms of data storage, and storage system 720 also may be in communication with computing device 701. In another embodiment, storage system 720, which may comprise a plurality of repositories, may be housed in one or more of computing device 701. In some examples, storage system 720 may store neural networks, user data (e.g., smartphone interaction data, symptoms and other survey data, sessions data, dosing data, aggregated data, other cross-reference data, as described herein), models, instructions, programs, and other various types of information as described herein. This information may be retrieved or otherwise accessed by one or more computing devices, such as computing device 701, in order to perform some or all of the features described herein. Storage system 720 may comprise any type of computer storage, such as a hard drive, memory card, ROM, RAM, DVD, CD-ROM, write-capable, and read-only memories. In addition, storage system 720 may include a distributed storage system where data is stored on a plurality of different storage devices, which may be physically located at the same or different geographic locations (e.g., in a distributed computing system such as system 750 in FIG. 7B). Storage system 720 may be networked to computing device 701 directly using wired connections and/or wireless connections. Such network may include various configurations and protocols, including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Computing device 701, which in some examples may be included in a mobile device and in other examples may be included in a server, also may include a memory 702. In other examples, computing device 701 may be implemented at an edge node or other remote computing facility. Memory 702 may comprise a storage system configured to store a database 714 and an application 716. Application 716 may include instructions which, when executed by a processor 704, cause computing device 701 to perform various steps and/or functions (e.g., implementing a health platform, a model for pre-processing and analyzing smartphone activity data, a model for generating action data, and/or other models), as described herein. Application 716 further may include instructions for generating a user interface 718 (e.g., graphical user interface (GUI)). Database 714 may store various algorithms and/or data, including neural networks and data regarding symptoms, sessions, mental health disorders, demographics, among other types of data. Memory 702 may include any non-transitory computer-readable storage medium for storing data and/or software that is executable by processor 704, and/or any other medium which may be used to store information that may be accessed by processor 704 to control the operation of computing device 501.

Computing device 701 may further include a display 706, a network interface 708, an input device 710, and/or an output module 712. Display 706 may be any display device by means of which computing device 701 may output and/or display data. Network interface 708 may be configured to connect to a network using any of the wired and wireless short range communication protocols described above, as well as a cellular data network, a satellite network, free space optical network and/or the Internet. Input device 710 may be a mouse, keyboard, touch screen, voice interface, and/or any or other hand-held controller or device or interface by means of which a user may interact with computing device 701. Output module 712 may be a bus, port, and/or other interfaces by means of which computing device 701 may connect to and/or output data to other devices and/or peripherals.

In one embodiment, computing device 701 may be a data center or other control facility (e.g., configured to run a distributed computing system as described herein), and may communicate with other computing devices. As described herein, system 700, and particularly computing device 701, may be used for implementing the models described herein, running an application, generating user recommendations, providing feedback to a server, and otherwise implementing steps in a mental healthcare recommendations method, as described herein. Various configurations of system 700 are envisioned, and various steps and/or functions of the processes described herein may be shared among the various devices of system 700 or may be assigned to specific devices.

Figure 7B:
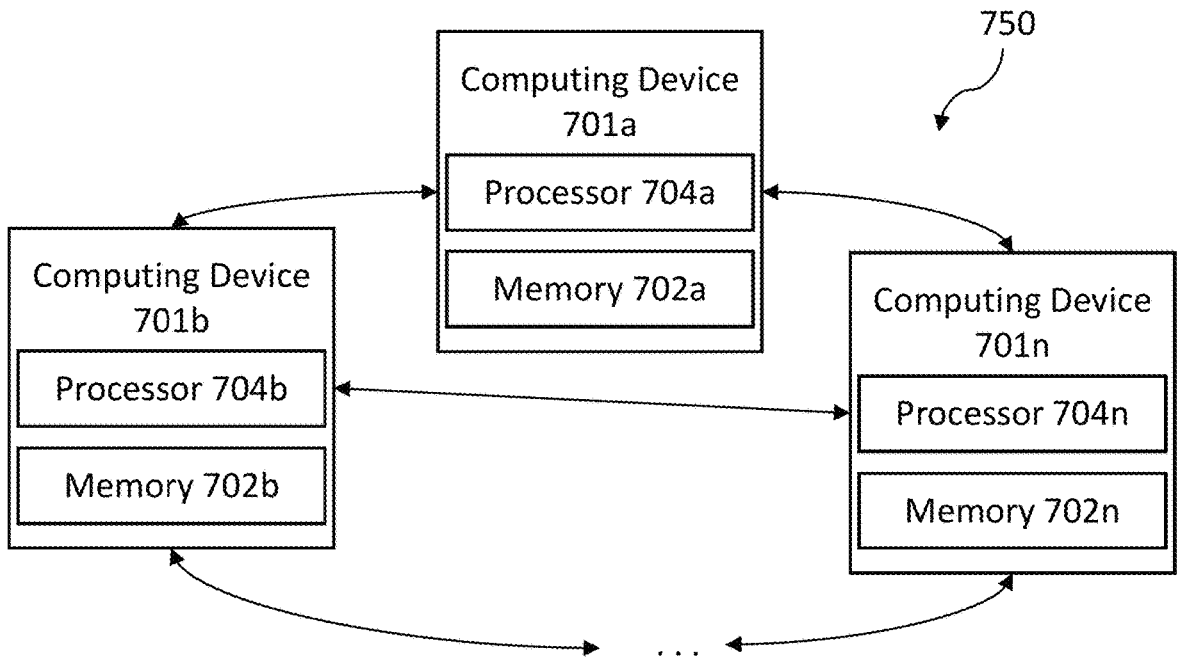
FIG. 7B is a simplified block diagram of an example distributed computing system implemented by a plurality of the computing devices, in accordance with one or more embodiments.

FIG. 7B is a simplified block diagram of an example distributed computing system implemented by a plurality of the computing devices, in accordance with one or more embodiments. System 750 may comprise two or more computing devices 701a-n. In some examples, each of 701a-n may comprise one or more of processors 704a-n, respectively, and one or more of memory 702a-n, respectively. Processors 704a-n may function similarly to processor 704 in FIG. 7A, as described above. Memory 702a-n may function similarly to memory 702 in FIG. 7A, as described above.

Figure 8:
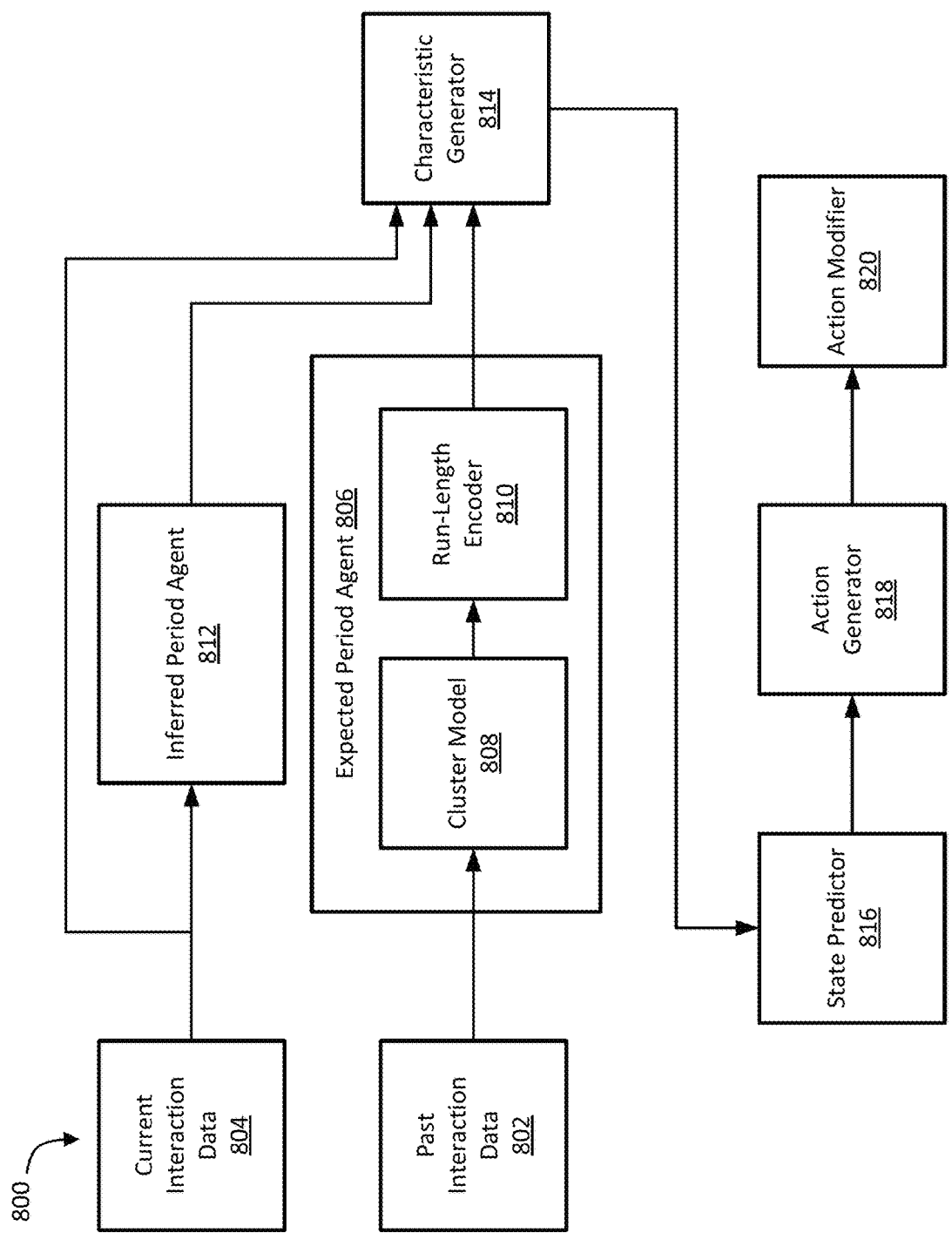
FIG. 8 is a block diagram that shows components included in a computing system, in accordance with one or more embodiments.

FIG. 8 is a schematic diagram of components 800 that can be included in a computing system to predict states and generate actions, according to an embodiment. The components 800 can be associated with a computing device (e.g., a computing device that is structurally and/or functionally similar to the computing device 701 of FIG. 7A). In some instances, for example, the components 800 can be (1) implemented as software stored in memory that is functionally and/or structurally similar to the memory 702a and (2) configured to be executed via a processor that is functionally and/or structurally similar to the processor 704a of FIG. 7A. In some instances, for example, at least a portion of the components 800 can be implemented in hardware. The components 800 include past interaction data 802, current interaction data 804, an expected period agent 806, an inferred period agent 812, a characteristic generator 814, a state predictor 816, an action generator 818, and an action modifier 820.

The past interaction data 802 can be associated with at least one mobile compute device of a user and can be collected over a first period of time (e.g., a week, a month, etc.). The current interaction data 804 can be associated with the mobile compute device and collected over a second period of time (e.g., 24 hours, etc.). In some instances, the first period of time can be longer than the second period of time. In some implementations, the past interaction data 802 and/or the current interaction data 804 can include and/or be organized within bins having predefined intervals (e.g., predefined time intervals). In some instances, the current interaction data 804 can be associated with a day that is included in a plurality of days that is associated with the past interaction data 802. The past interaction data 802 can be provided as input to the expected period indicator generator 806 to generate an expected time window indication, and the current interaction data 804 can be provided as input to the inferred period agent 812 to generate an inferred time window indication, as described herein. The current interaction data 804 can also be provided as input to the characteristic generator 814 to generate, for example, a disruption metric, as described herein.

The expected period agent 806 includes a cluster model 808 and a run-length encoder 810. The expected period agent 806 can generate an expected time window indication based on the past interaction data 802. Specifically, the cluster model 808 can include, for example, a k-means cluster model that can generate an activity cluster and an inactivity cluster based on the past interaction data 802. Each cluster can include at least one data point, and each data point from the at least one data point can be associated with a bin (e.g., a specific time interval, such as 12:00 am-12:14 am) that is different from remaining bins from a plurality of bins (e.g., that collectively represent a 24-hour period and/or that the past interaction data 802, collected over a 30-day window or the like, is aggregated into). Each data point (e.g., bin) can also be associated with an activity metric (e.g., an activity percentage), which can be calculated based on a number of days within the time window that have activity at the time interval represented by the bin. The cluster model 808 can binarize the activity metrics to produce the activity cluster and the inactivity cluster, where the inactivity cluster has a lower inactivity cluster metric than the activity cluster. The inactivity cluster (e.g., the bins associated with an activity metric value of 0) can be provided as input to the run-length encoder 810, which can generate indications of inactivity periods (e.g., aggregated time periods represented by concurrent, aggregated bin intervals). The expected period agent 806 can select an indication of an inactivity period (e.g., having a start time and a duration) from the plurality of indications of the inactivity periods based on that inactivity period having the longest length, and that indication of the inactivity period can be designated as the expected time window indication (e.g., the ESP).

The inferred period agent 812 can include a run-length encoder (e.g., the run-length encoder 810 and/or a run-length encoder that is functionally and/or structurally similar to the run-length encoder 810). The inferred period agent 812 can use the run-length encoder to determine a longest inactive period (e.g., that is different from the longest inactive period determined by the expected period indicator) based on binned data included in the current interaction data 804. This longest inactive period can be designated as an inferred time window indication (e.g., the ISP). The expected time window indication, the inferred time window indication, and/or the current interaction data 804 can be provided as input to the characteristic generator 814 to generate one or more characteristic values associated with one or more characteristic metrics (e.g., a consistency metric and/or a disruption metric).

The consistency metric generated by the characteristic generator 814 can include, for example, an overlap percentage, which the characteristic generator 814 can determine based on (1) the expected time window indication generated by the expected period agent 806 and (2) the inferred time window indication generated by the inferred period agent 812. More specifically, the overlap percentage can be determined based on the number of bins that are associated with both the expected time window indication and the inferred time window indication (e.g., each bin that has a respective time interval (e.g., 1:00 am-1:14 am) that is within both the time interval of the expected time window indication (e.g., 10:00 pm-5:59 am) and the time interval of the inferred time window indication (e.g., 11:15 am-4:59 am)). The characteristic generator 814 can divide this number of bins by the total number of bins associated with the expected time window indication to determine the overlap percentage. The overlap percentage can be determined on a daily basis and/or over multiple days (e.g., a week, a month, etc.).

The characteristic generator 814 can generate the disruption metric based on the current interaction data 804 and the expected time window indication generated by the expected period agent 806. More specifically, the disruption metric can be generated based on the number of bins included in the current interaction data 804 that (1) had activity (e.g., a detected mobile device interaction) and (2) are within the time interval (e.g., 10:00 pm-5:59 am) defined by the expected time window indication.

The state predictor 816 can include, for example, a model (e.g., a multilevel model, a neural network, etc.) configured to generate an indication of a state (e.g., a mental health condition) based on a correlation between the characteristic metric(s) generated by the characteristic generator 814 and the state. The model can also receive as input and/or be trained on population data (e.g., population characteristic data and population state data) to generate the indication of the state for the user. The user can be included in the population or excluded from the population. The action generator 818 can include a machine learning model (e.g., a neural network) configured to map a first vector associated with the indication of the state (e.g., a current state) for the user to a second vector associated (1) with an action and (2) a different state (e.g., a state that user desires to transition to from the current state).

The action modifier 820 can be configured to detect a change in a characteristic metric(s) generated by the characteristic generator 814 and, based on this change, prompt a user (e.g., via notification) to input additional data (e.g., state data, such as a response(s) to a mental health question(s) indicated by the notification). In some instances, the action modifier 802 can cause notifications (e.g., requests for additional state data) to be sent to the user at a higher frequency based on a detected change in a characteristic metric(s). The additional data can establish a baseline to determine a directionality associated with the state and the action (e.g., an indication of whether a change in mental health state is causing a change in smartphone interactions or a change in smartphone interactions is causing a change in mental health state).

Figure 9:
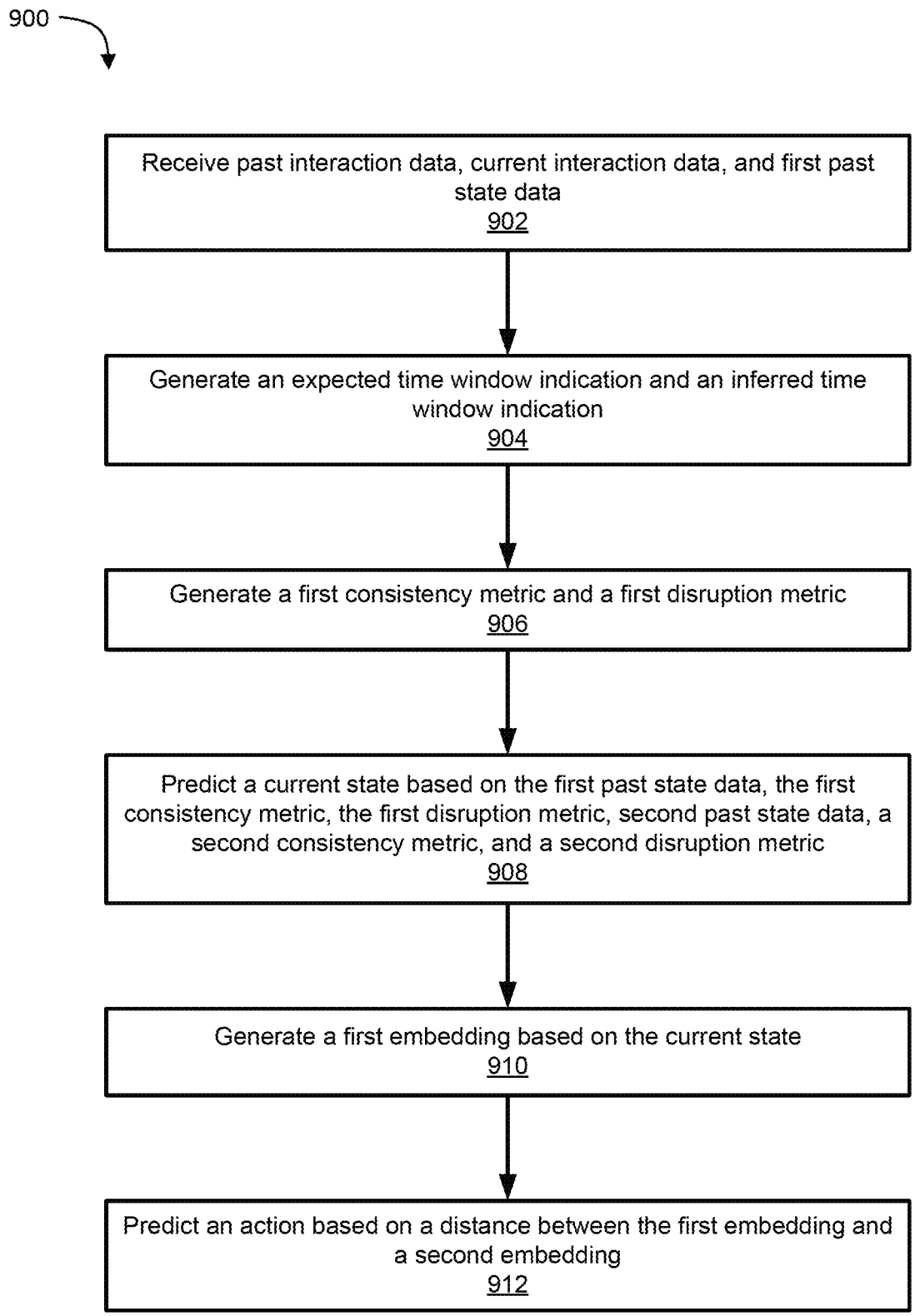
FIG. 9 is a flow diagram illustrating a method implemented by a computing system, in accordance with one or more embodiments.

FIG. 9 is a flowchart showing a method 900 of using a computing system to predict an action, according to an embodiment. The method 900 can be implemented by a computing system that is structurally and/or functionally similar to the computing system 700 of FIG. 7A. Portions of the method 900 can be implemented using a processor (e.g., the processors 704 of FIG. 7A) of any suitable computing device (e.g., the computing device 701 of FIG. 7A).

The method 900 at 902 includes receiving (1) past interaction data associated with (a) a mobile device and (b) a first user, (2) current interaction data associated with the mobile device and the first user, and (3) first past state data associated with the first user. At 904, based on the past interaction data, an expected time window indication is generated, and based on the current interaction data, an inferred time window indication is generated. A first consistency metric is generated at 906 based on the inferred time window indication and the expected time window indication. Also at 906, a first disruption metric is generated based on the current interaction data and the expected time window indication. The method 900 at 908 includes predicting a current state associated with the first user, based on (1) the first past state data, (2) the first consistency metric, (3) the first disruption metric, (4) second past state data associated with a second user, (5) a second consistency metric associated with the second user, and (6) a second disruption metric associated with the second user. A first embedding is generated at 910 based on the current state, and at 912, an action to cause the first user to have a future state is predicted based on a distance between the first embedding and a second embedding associated with the second user.

Figure 10:
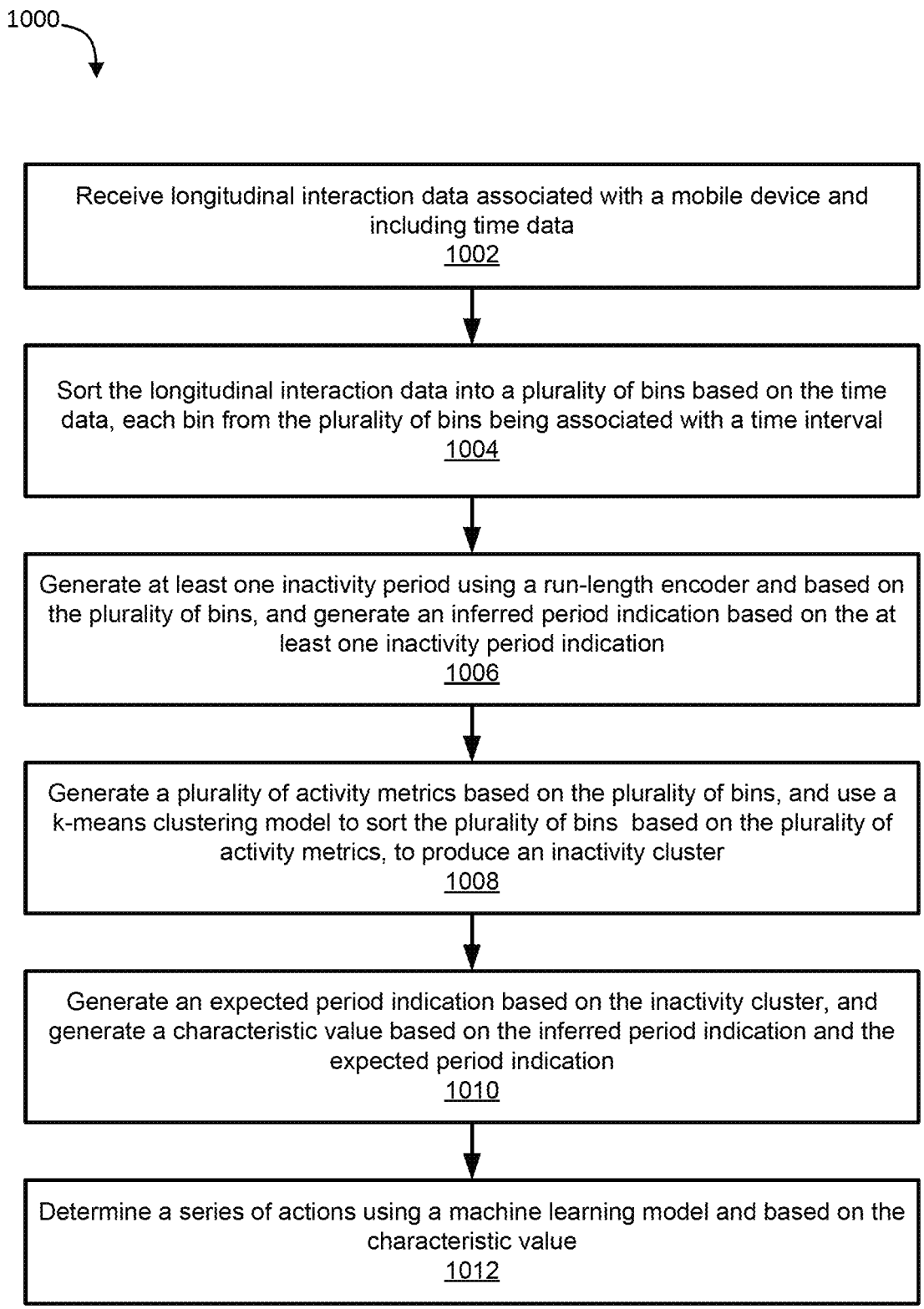
FIG. 10 is a flow diagram illustrating a method implemented by a computing system, in accordance with one or more embodiments.

FIG. 10 is a flowchart showing a method 1000 of using a computing system to determine a series of actions, according to an embodiment. The method 1000 can be implemented by a computing system that is structurally and/or functionally similar to the computing system 700 of FIG. 7A. Portions of the method 1000 can be implemented using a processor (e.g., the processors 704 of FIG. 7A) of any suitable computing device (e.g., the computing device 701 of FIG. 7A).

The method 1000 at 1002 includes receiving, at a processor, longitudinal interaction data associated with a mobile device and including time data. At 1004, the method 1000 includes sorting, via the processor, the longitudinal interaction data into a plurality of bins based on the time data, each bin from the plurality of bins being associated with a time interval. Using a run-length encoder, and based on the plurality of bins, at least one inactivity period indication is generated at 1006 via the processor, and an inferred period indication is also generated via the processor and based on the at least one inactivity period indication. The method 1000 at 1008 includes (1) generating, via the processor and based on the plurality of bins, a plurality of activity metrics and (2) sorting, via the processor, using a k-means clustering model, and based on the plurality of activity metrics, the plurality of bins to produce an inactivity cluster. An expected period indication is generated at 1010 via the processor and based on the inactivity cluster, and a characteristic value is also generated via the processor and based on (1) the inferred period indication and (2) the expected period indication. Using a machine learning model, a series of actions is determined at 1012 via the processor and based on the characteristic value.

In some embodiments, a non-transitory processor-readable medium stores code representing instructions to be executed by one or more processors, the instructions including code to cause the one or more processors to receive (1) past interaction data associated with (a) a mobile device and (b) a first user, (2) current interaction data associated with the mobile device and the first user, and (3) first past state data associated with the first user. Based on the past interaction data, an expected time window indication is generated, and based on the current interaction data, an inferred time window indication is generated. A first consistency metric is generated based on the inferred time window indication and the expected time window indication. A first disruption metric is generated based on the current interaction data and the expected time window indication. The instructions also include code to cause the one or more processors to predict a current state associated with the first user, based on the first past state data, the first consistency metric, the first disruption metric, second past state data associated with a second user, a second consistency metric associated with the second user, and a second disruption metric associated with the second user. A first embedding is generated based on the current state, and an action to cause the first user to have a future state is predicted based on a distance between the first embedding and a second embedding associated with the second user.

In some implementations, the current state can be a first current state, the action can be a first action, and the instructions can further include code to cause the one or more processors to predict a second current state associated with the first user and, based on a difference between the second current state and the first current state, cause a state request to be sent to the mobile device. An indication of a third state can be received from the mobile device in response to the state request, and a directionality metric associated with the first action can be determined based on the third state. The first action can be modified to produce a second action based on the directionality metric.

In some implementations, the instructions can further include code to cause the one or more processors to generate an anomaly alert based on the current state. In some implementations, the first consistency metric can be associated with a time-variant overlap percentage, and the second consistency metric can be associated with a time-invariant overlap percentage. In some implementations, the past interaction data and the current interaction data can each include a sequence of bins, each bin from the sequence of bins being associated with a predefined time interval.

In some implementations, the code to cause the one or more processors to generate the inferred time window indication can include code to cause the one or more processors to generate, using a run-length encoding function and based on a sequence of bins included in the current interaction data, at least one inactivity period indication. For each 24-hour period from at least one 24-hour period associated with the current interaction data, the inferred time window indication can be generated based on an inactivity period indication from the at least one inactivity period indication, the inactivity period indication specifying a longer duration than a remaining inactivity period indication from the at least one inactivity period indication. The instructions can also include code to cause the one or more processors to generate the inferred time window indication based on the inferred time window indication generated for each 24-hour period from the at least one 24-hour period.

In some implementations, the code to cause the one or more processors to generate the expected time window indication can include code to cause the one or more processors to generate, based on (1) the past interaction data included in a sequence of bins and (2) a predefined window length, an activity metric. Using a k-means clustering model and based on the activity metric, the past interaction data can be sorted to produce an activity cluster and an inactivity cluster. The activity cluster can be binarized to produce a binarized activity cluster, and the inactivity cluster can be binarized to produce a binarized inactivity cluster. The code can also include code to cause the one or more processors to generate a sequence of binarized bin data based on (1) the binarized activity cluster, (2) the binarized inactivity cluster, and (3) the sequence of bins. For the predefined window length, the expected time window indication can be generated based on the sequence of binarized bin data.

In some implementations, the inactivity cluster can have a lower activity metric centroid than the activity cluster. In some implementations, the past interaction data and the first past state data can each be associated with longitudinal data. In some implementations, the first consistency metric can include at least one of an indication of a longest period of inactivity, an indication of a regularity of the current interaction data, or an overlap percentage associated with (1) the current interaction data and (2) the expected time window indication. In some implementations, the current interaction data can include time data and an application change indication.

In some embodiments, a method includes receiving, at a processor, longitudinal interaction data associated with a mobile device and including time data. The method also includes sorting, via the processor, the longitudinal interaction data into a plurality of bins based on the time data, each bin from the plurality of bins being associated with a time interval. Using a run-length encoder, and based on the plurality of bins, at least one inactivity period indication is generated via the processor, and an inferred period indication is generated via the processor and based on the at least one inactivity period indication. The method also includes (1) generating, via the processor and based on the plurality of bins, a plurality of activity metrics and (2) sorting, via the processor, using a k-means clustering model, and based on the plurality of activity metrics, the plurality of bins to produce an inactivity cluster. An expected period indication is generated via the processor and based on the inactivity cluster, and a characteristic value is generated via the processor and based on (1) the inferred period indication and (2) the expected period indication. Using a machine learning model, a series of actions is determined via the processor and based on the characteristic value.

In some implementations, the method can further include predicting, via the processor and using a machine learning model, a future state based on the characteristic value and the series of actions. In some implementations, the characteristic value can be a first characteristic value, the series of actions can be a first series of actions, the machine learning model can be an unsupervised machine learning model, and the predicting can include predicting, via the processor, the future state based on a feedback signal that is provided as input to the unsupervised machine learning model and is generated based on (1) a second characteristic value generated before the first characteristic value and (2) a second series of actions determined before the first series of actions.

In some implementations, the method can further include generating an anomaly alert based on the characteristic value. In some implementations, the longitudinal interaction data can include time data and an application change indication. In some implementations, the sorting can include sorting the plurality of bins to produce the inactivity cluster and an activity cluster, and the inactivity cluster can have a lower activity metric centroid than the activity cluster. In some implementations, the characteristic value can include at least one of an indication of a longest period of inactivity, an indication of a regularity of the longitudinal interaction data, or an overlap percentage associated with (1) the inferred period indication and (2) the expected period indication. In some implementations, the generating the characteristic value can include generating the characteristic value based on circumstance data.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A non-transitory processor-readable medium storing code representing instructions to be executed by one or more processors, the instructions comprising code to cause the one or more processors to:
   receive (1) past interaction data associated with (a) a mobile device and (b) a user, (2) current interaction data associated with the mobile device and the user, and (3) past state data associated with the user;
   generate, based on the past interaction data, an expected time window indication;
   generate, based on the current interaction data, an inferred time window indication;

generate a consistency metric based on the inferred time window indication and the expected time window indication;
generate a disruption metric based on the current interaction data and the expected time window indication;
predict a current state associated with the user based on the past state data, the consistency metric, and the disruption metric;
predict a first action based on the current state; and
provide the current state and an indication of the first action as input to a machine learning model to predict a future state, the machine learning model being configured based on a feedback signal that is generated based on (a) the past state data and (b) a second action determined before the first action.

2. The non-transitory processor-readable medium of claim 1, wherein the current state is a first current state, and the instructions further include code to cause the one or more processors to:
predict a second current state associated with the user;
based on a difference between the second current state and the first current state, cause a state request to be sent to the mobile device;
receive an indication of a third state from the mobile device in response to the state request;
determine a directionality metric associated with the first action based on the third state; and
modify the first action to produce a third action based on the directionality metric.

3. The non-transitory processor-readable medium of claim 1, wherein the instructions further include code to cause the one or more processors to generate an anomaly alert based on the current state.

4. The non-transitory processor-readable medium of claim 1, wherein:
the consistency metric is associated with a time-variant overlap percentage.

5. The non-transitory processor-readable medium of claim 1, wherein the past interaction data and the current interaction data each includes a sequence of bins, each bin from the sequence of bins being associated with a predefined time interval.

6. The non-transitory processor-readable medium of claim 1, wherein the code to cause the one or more processors to generate the inferred time window indication includes code to cause the one or more processors to:
provide a sequence of bins included in the current interaction data as input to a run-length encoding function to produce at least one inactivity period indication;
generate, for each 24-hour period from at least one 24-hour period associated with the current interaction data, the inferred time window indication based on an inactivity period indication from the at least one inactivity period indication, the inactivity period indication specifying a longer duration than a remaining inactivity period indication from the at least one inactivity period indication; and
generate the inferred time window indication based on the inferred time window indication generated for each 24-hour period from the at least one 24-hour period.

7. The non-transitory processor-readable medium of claim 1, wherein the code to cause the one or more processors to generate the expected time window indication includes code to cause the one or more processors to:
generate, based on (1) the past interaction data included in a sequence of bins and (2) a predefined window length, an activity metric;
provide the past interaction data and the activity metric as input to a k-means clustering model to sort the past interaction data to produce an activity cluster and an inactivity cluster;
binarize the activity cluster to produce a binarized activity cluster;
binarize the inactivity cluster to produce a binarized inactivity cluster;
generate a sequence of binarized bin data based on the binarized activity cluster, the binarized inactivity cluster, and the sequence of bins; and
generate, for the predefined window length, the expected time window indication based on the sequence of binarized bin data.

8. The non-transitory processor-readable medium of claim 7, wherein the inactivity cluster has a lower activity metric centroid than the activity cluster.

9. The non-transitory processor-readable medium of claim 1, wherein the past interaction data and the past state data are each associated with longitudinal data.

10. The non-transitory processor-readable medium of claim 1, wherein the consistency metric includes at least one of an indication of a longest period of inactivity, an indication of a regularity of the current interaction data, or an overlap percentage associated with (1) the current interaction data and (2) the expected time window indication.

11. The non-transitory processor-readable medium of claim 1, wherein the current interaction data includes time data and an application change indication.

12. A method, comprising:
receiving, at a processor, longitudinal interaction data associated with a mobile device and including time data;
sorting, via the processor, the longitudinal interaction data into a plurality of bins based on the time data, each bin from the plurality of bins being associated with a time interval;
providing, via the processor, the plurality of bins as input to a run-length encoder to produce at least one inactivity period indication;
generating, via the processor, an inferred period indication based on the at least one inactivity period indication;
generating, via the processor and based on the plurality of bins, a plurality of activity metrics;
providing, via the processor, the plurality of activity metrics and the plurality of bins as input to a k-means clustering model to produce an inactivity cluster;
generating, via the processor, an expected period indication based on the inactivity cluster;
generating, via the processor, a first characteristic value based on the inferred period indication and the expected period indication;
providing, via the processor, the first characteristic value as input to a first machine learning model to determine a first series of clinical actions; and
predicting, via the processor, a future state by providing the first characteristic value and the first series of clinical actions as input to a second machine learning model trained based on a feedback signal that is generated based on (a) a second characteristic value generated before the first characteristic value and (b) a second series of clinical actions determined before the first series of clinical actions.

13. The method of claim 12, further comprising generating an anomaly alert based on the first characteristic value.

14. The method of claim 12, wherein the longitudinal interaction data includes time data and an application change indication.

15. The method of claim 12, wherein:
the sorting includes sorting the plurality of bins to produce the inactivity cluster and an activity cluster; and
the inactivity cluster has a lower activity metric centroid than the activity cluster.

16. The method of claim 12, wherein the first characteristic value includes at least one of an indication of a longest period of inactivity, an indication of a regularity of the longitudinal interaction data, or an overlap percentage associated with (1) the inferred period indication and (2) the expected period indication.

17. The method of claim 12, wherein the generating the first characteristic value includes generating the first characteristic value based on circumstance data.

\* \* \* \* \*